US008302392B2

(12) United States Patent
Tsubakino et al.

(10) Patent No.: US 8,302,392 B2
(45) Date of Patent: Nov. 6, 2012

(54) EXHAUST CONTROL DEVICE FOR VEHICLE ENGINE

(75) Inventors: Yukihiro Tsubakino, Saitama (JP); Shinsuke Yasui, Saitama (JP); Isao Azumagakito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 980 days.

(21) Appl. No.: 12/210,795

(22) Filed: Sep. 15, 2008

(65) Prior Publication Data

US 2009/0084098 A1 Apr. 2, 2009

(30) Foreign Application Priority Data

Sep. 28, 2007 (JP) ................................ 2007-256531

(51) Int. Cl.
*F01N 1/00* (2006.01)
*F01L 7/00* (2006.01)
*G05D 7/01* (2006.01)

(52) U.S. Cl. .................... 60/324; 123/190.4; 123/190.5; 123/190.6; 123/190.8; 123/568.29; 138/45; 138/46

(58) Field of Classification Search .................... 60/312, 60/313, 324; 138/45, 46; 123/190.4–190.8, 123/568.29

See application file for complete search history.

(56) References Cited

U.S. PATENT DOCUMENTS

| | | | | |
|---|---|---|---|---|
| 4,095,569 | A * | 6/1978 | Wakita et al. | 123/306 |
| 5,267,535 | A * | 12/1993 | Luo | 123/65 PE |
| 6,019,090 | A * | 2/2000 | Ozawa | 123/481 |
| 6,609,367 | B2 * | 8/2003 | Nakayasu et al. | 60/324 |
| 6,655,134 | B2 * | 12/2003 | Nakayasu et al. | 60/324 |
| 7,325,651 | B2 * | 2/2008 | Kikuchi et al. | 181/237 |
| 8,006,488 | B2 * | 8/2011 | Momosaki et al. | 60/324 |
| 2001/0027648 | A1 * | 10/2001 | Nakayasu et al. | 60/324 |
| 2001/0035009 | A1 * | 11/2001 | Nakayasu et al. | 60/324 |
| 2002/0112470 | A1 * | 8/2002 | Yamada et al. | 60/290 |
| 2008/0053066 | A1 * | 3/2008 | Nakagome et al. | 60/276 |

FOREIGN PATENT DOCUMENTS

JP 2-49936 A 2/1990

* cited by examiner

*Primary Examiner* — Kenneth Bomberg
*Assistant Examiner* — Dapinder Singh
(74) *Attorney, Agent, or Firm* — Birch, Stewart, Kolasch & Birch, LLP

(57) ABSTRACT

An exhaust control device for a vehicle engine includes an exhaust control valve capable of changing the opening area of an exhaust passage. The exhaust control valve is disposed in exhaust passage forming means so as to be able to change a bent-internal side partial passage sectional area of the passage sectional area of an exhaust passage. Specifically the exhaust control valve is disposed at a bent portion of the exhaust passage that is closest to an exhaust valve port. With this configuration, the exhaust flow rate can be controlled satisfactorily.

19 Claims, 14 Drawing Sheets

EXHAUST CONTROL DEVICE FOR VEHICLE ENGINE

CROSS-REFERENCE TO RELATED APPLICATION

The present application claims priority tinder 35 U.S.C. §119 to Japanese Patent Application No. 2007-256531, filed Sep. 28, 2007, the entire contents of which are hereby incorporated by reference.

BACKGROUND OF THE INVENTION

1. Field of the Invention

The present invention relates to an exhaust control device for a vehicle engine, in which an exhaust valve capable of opening and closing an exhaust valve port provided in a cylinder head to face a combustion chamber is provided in the cylinder head so as to be able to be operatively opened and closed and an exhaust control valve capable of changing the opening area of an exhaust passage is disposed in exhaust passage forming means forming the exhaust passage that has a bent portion and is continuous with the exhaust valve port.

2. Description of Background Art

Japanese Patent Laid-Open No. Hei 2-049936 discloses an exhaust control device for a vehicle engine in which an exhaust control valve, a butterfly valve, is disposed at the bent portion of an exhaust passage that has a bent portion and is continuous with an exhaust valve port.

In the exhaust control device disclosed in Japanese Patent Laid-Open No. Hei 2-049936, a butterfly valve is disposed at the general center of the bent portion in the exhaust passage. When a butterfly valve is fully closed, exhaust passes through between the inner wall of the exhaust passage and the butterfly valve not only at a bent-external portion where a flow rate is high but also at a bent-internal portion where the flow rate is low. Thus, because of the nonconstant exhaust flow rate, it is difficult to control the exhaust flow rate and flow with accuracy.

SUMMARY AND OBJECTS OF THE INVENTION

In view of the foregoing, the present invention has been made and it is an object of the invention to provide an exhaust control device for a vehicle engine that can satisfactorily control an exhaust flow rate.

To achieve the above object, according to an embodiment of the present invention, an exhaust control device for a vehicle engine includes an exhaust valve capable of opening and closing an exhaust valve port is provided in a cylinder head to face a combustion chamber in the cylinder head. The exhaust valve is able to be operatively opened and closed, and an exhaust control valve capable of changing the opening area of an exhaust passage is disposed in exhaust passage forming means forming the exhaust passage that has a bent portion and is continuous with the exhaust valve port. The exhaust control valve is disposed in the exhaust passage forming means so as to be able to change a bent-inner side partial passage sectional area, of a passage sectional area of the exhaust passage, at the bent portion closest to the exhaust valve port.

According to an embodiment of the present invention, the exhaust control valve is a rotary valve whose external surface is continuously flush with the internal surface of the exhaust passage when fully opened and is smoothly continuous with the inner surface of the exhaust passage on the upstream side of the exhaust control valve when closed. A control unit that controls an actuator operatively opening and closing the exhaust control valve controls the actuator to bring the exhaust control valve into a fully opened state during the high-speed operation of the engine, and into a fully closed state where the passage sectional area of the exhaust passage is closed half or more thereof during the mid- and low-speed operation of the engine.

According to an embodiment of the present invention, the control unit controls operation of the actuator to open or close the exhaust control valve on the basis of at least one of throttle opening and engine revolutions and of a gear position of a transmission.

According to an embodiment of the present invention, the control unit makes a determination as to whether or not a vehicle is being decelerated and if deceleration is determined, the control unit operates the actuator to close the exhaust control valve for applying engine brake.

According to an embodiment of the present invention, the control unit makes a determination as to whether or not a vehicle is being suddenly-accelerated and if sudden acceleration is determined, the control unit operates the actuator to temporarily close the exhaust control valve for temporarily suppressing engine power.

Effects of the invention include the following:

The exhaust control valve changes the bent-internal side partial passage sectional area, of a passage sectional area of the exhaust passage, at the bent portion closest to the exhaust valve port. In other wards, the exhaust control valve is disposed at a portion where it is close to the combustion chamber and the exhaust flow rate is high even located on the bent-internal side. Thus, it is possible to produce an exhaust control effect at a maximum without enlargement of the exhaust control valve. In the state where the exhaust control valve is closed, exhaust flows only on the bent-external side, of the bent portion, where the exhaust flow rate is high. Thus, it is possible for the exhaust control valve to reduce the amount of exhaust while maintaining the exhaust flow rate. The occurrence of turbulent flow is suppressed while relieving the turbulence of exhaust flowing on the bent-external side in the bent portion, thereby enabling satisfactory exhaust control. In addition, since the exhaust control valve is located at a position close to the combustion chamber, it is possible to suppress the blow-by of fresh air resulting from the pressure control inside the combustion chamber by the exhaust control valve and from the overlapping of the opening timing of the exhaust valve and the intake valve.

In addition, the exhaust control valve is a rotary valve having a wall that is continuously flush with the inner surface of the exhaust passage when fully opened and is smoothly continuous with the inner surface of the exhaust passage on the upstream side of the exhaust control valve when closed. When fully opened, the exhaust control valve will not reduce the exhaust passage sectional area. During the high-speed operation of the engine, the exhaust control valve is fully opened. During the mid- and low-speed operation, the exhaust control valve is brought into the fully closed state where the passage sectional area of the exhaust passage is closed half or more thereof. Thus, during the high-speed operation, it is possible to improve the discharge of the exhaust from the combustion chamber without reducing the sectional area of the exhaust passage and to improve combustion efficiency by allowing fresh air to effectively flow in the combustion engine. In addition, during mid- and low-speed operation, the pressure in the combustion chamber is increased while preventing the blow-by of fresh air by retarding the discharge of the exhaust from the combustion engine, thereby increasing engine power.

Further, it is possible to exercise optimum opening and closing control on the exhaust control valve conforming to at least one of throttle opening, i.e., an index indicating the state of the combustion chamber and the engine revolutions, and the gear position of the transmission.

Still further, it is possible to apply engine brake during deceleration by the exhaust control valve which intends to increase the engine power.

Still further, it is possible to make the grip of the wheel satisfactory by temporarily closing the exhaust control valve during sudden acceleration to temporarily lowering the power without impairing acceleration-operational feeling.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

FIGS. 1 through 7 illustrate a first embodiment of the present invention.

Figure 1:
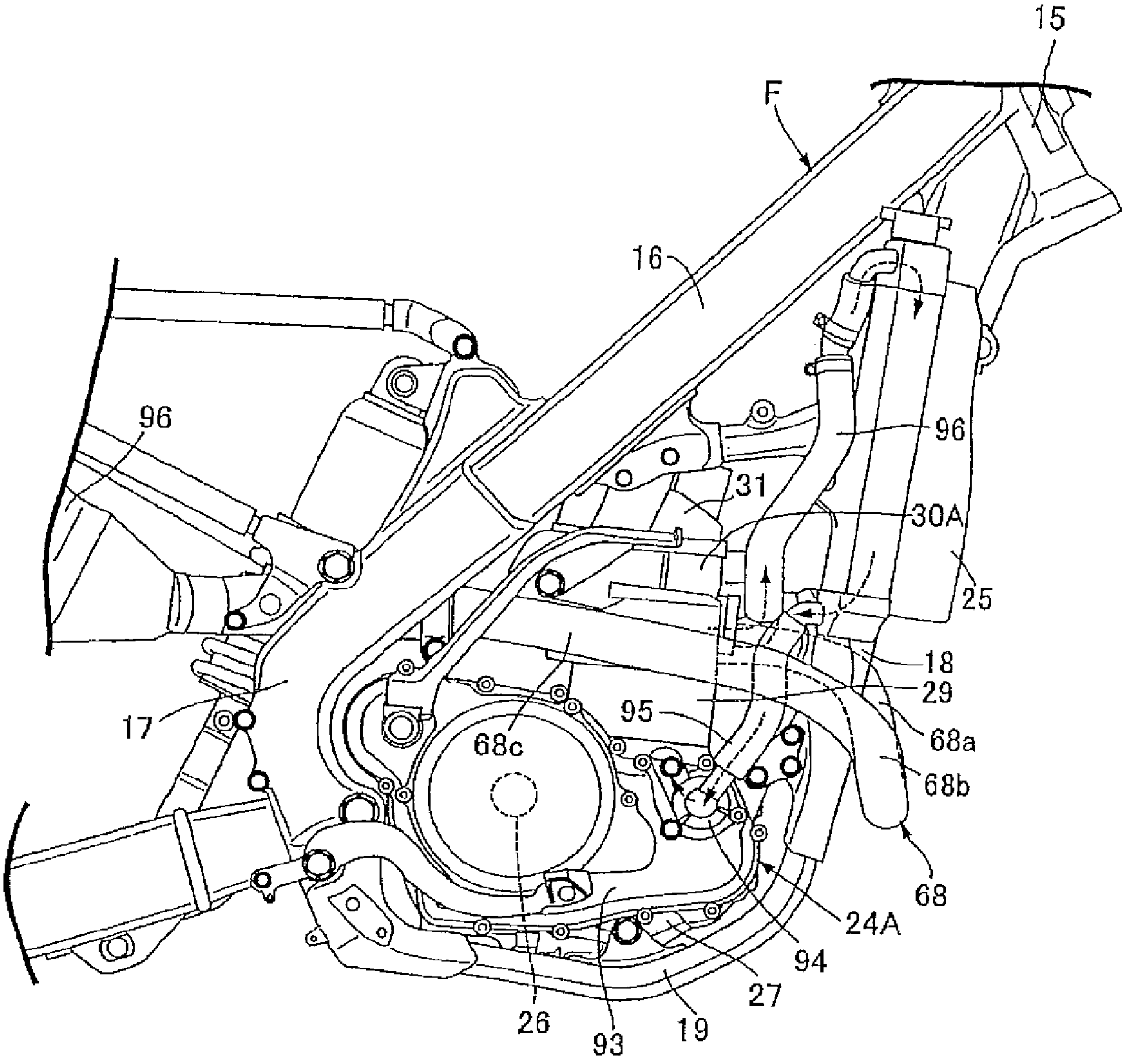
FIG. 1 is a right lateral view illustrating an essential portion of a motorcycle according to a first embodiment.

Referring first to FIG. 1, a body frame F of a motorcycle, a small-sized vehicle, includes a head pipe 15 provided at a front end; a pair of left and right main frames 16 extending rearward downward from the head pipe 15; a pair of left and right pivot plates 17 joined respectively to the rear portions of the main frames 16 and extending downward; a down frame 18 extending downward from the head pipe 15; and a pair of left and right lower frames 19 connecting the lower end of the down frame 18 with both the pivot plates 17. An engine body 24A of a water-cooled 4-cycle single-cylinder engine is carried by the body frame F so as to be disposed in a space surrounded by the main frames 16, the pivot plates 17, the down frame 18 and the lower frames 19. Radiators 25 are separately disposed forward of the engine body 24A to lie on either side of the down frame 18 and carried by the down frame 18.

Figure 2:
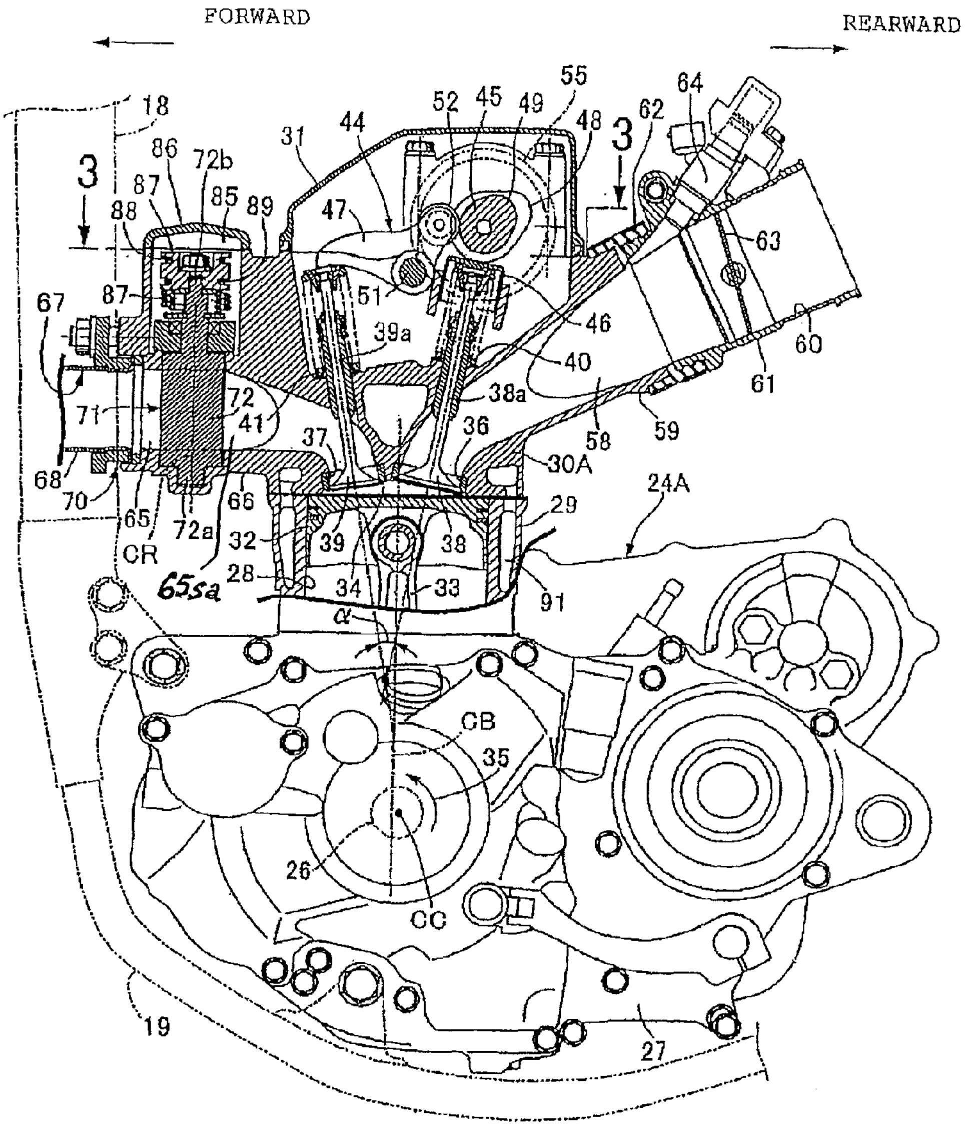
FIG. 2 is a longitudinally cross-sectional lateral view of a 4-cycle engine, taken along line 2-2 of FIG. 3.

With additional reference to FIG. 2, the engine body 24A includes a crankcase 27, a cylinder block 29, a cylinder head 30A, and a head cover 31. The crankcase 27 rotatably supports a crankshaft 26 with an axis extending in the left-right direction of the motorcycle. The cylinder block 29 has a cylinder bore 28 and is joined to the upper portion of the crankcase 27. The cylinder head 30A is joined to the upper portion of the cylinder block 29. The head cover 31 is joined to the upper portion of the cylinder head 30A. In the state where the engine body 24A is mounted on the engine frame F, the cylinder block 29 is joined to the crankcase 27 such that the axis CB of the cylinder bore 28 is slightly slanted forwardly upwardly.

A piston 32 is slidably fitted into the cylinder bore 28. This piston 32 is connected to the crankshaft 26 via a connecting rod 33. A combustion chamber 34 is defined between the cylinder block 29 and the cylinder head 30A so as to be faced by the top of the piston 32.

The crankshaft 26 is rotated in the rotating direction indicated with arrow 35 in response to the reciprocatory sliding of the piston 32 in the cylinder bore 28. The axis CB of the cylinder bore 28 is set to be offset in the rotating direction 35 from the axis CC of the crankshaft 26. This setting can suppress wear of the internal surface of the cylinder bore 28 due to the piston 32 coming into slidable contact therewith. Thus, it is possible to prevent the cylinder block 29 and the combustion chamber 34 from being raised to a high temperature due to such wear.

The cylinder head 30A is provided with a pair of intake valve ports 36 and a pair of exhaust valve ports 37 which face the combustion chamber 34. A pair of intake valves 38 opening and closing the respective intake vale ports 36 and a pair of exhaust valves 39 opening and closing the respective exhaust valve ports 37 are provided in the cylinder head 30A so as to enable opening and closing operation. The intake valves 38 are biased in the valve-closing direction by respective valve springs 40 and the exhaust valves 39 are biased in the valve-closing direction by respective valve springs 41.

Figure 3:
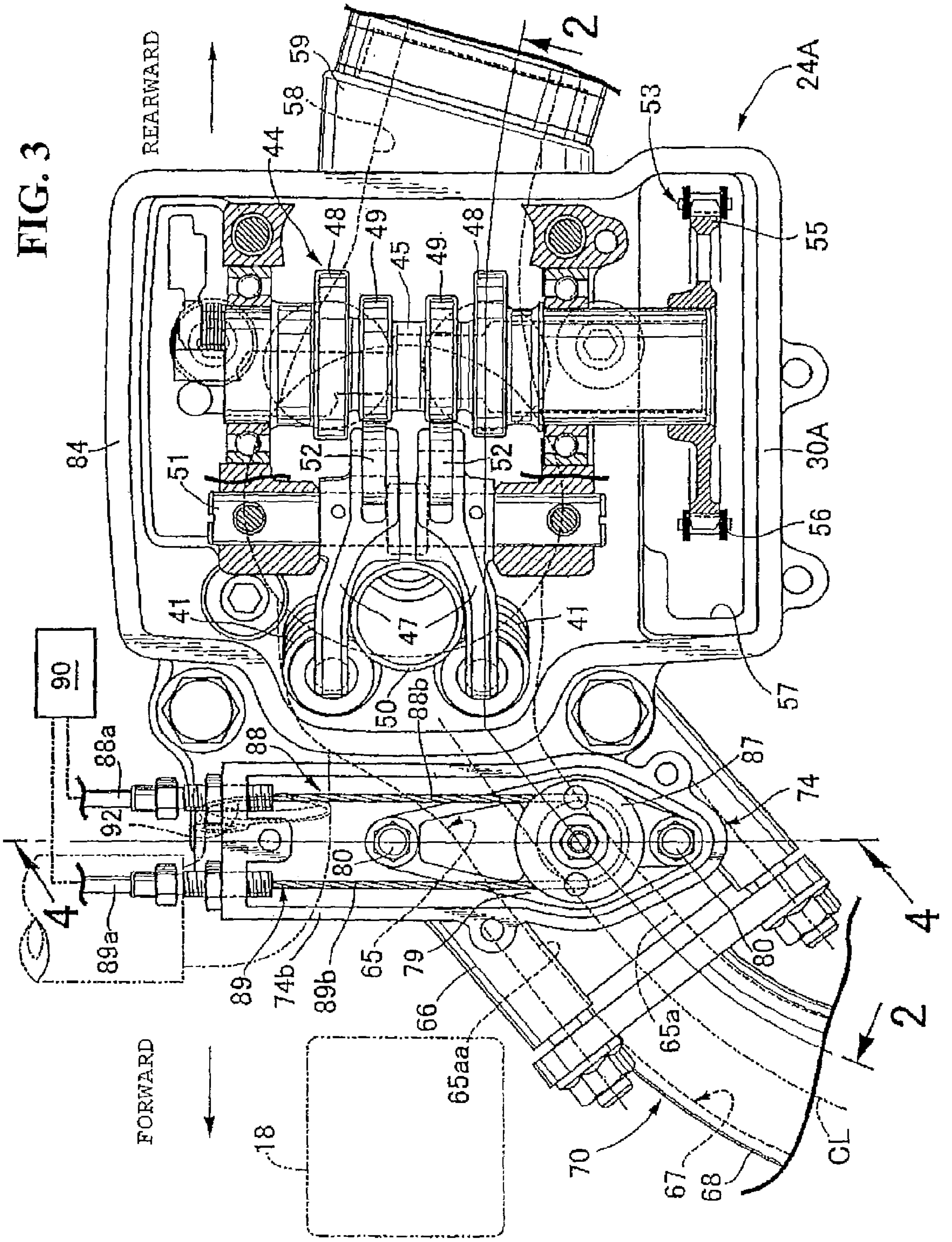
FIG. 3 is an enlarged cross-sectional view taken along line 3-3 of FIG. 2.

With additional reference to FIG. 3, a valve operating device 44 which drivingly opens and closes the intake valves 38 and the exhaust valves 39 is accommodated between the cylinder head 30A and the bead cover 31. This valve operating device 44 includes a camshaft 453 a pair of valve lifters 46 and a pair of rocker arms 47 and is configured as an SOHC type. The cam shaft 45 is disposed above the intake valves 38 to have an axis parallel to the crankshaft 26 and is turnably supported by the cylinder head 30A. The valve lifters 46 are each interposed between a corresponding one of a pair of intake side cams 48 provided on the camshaft 45 and a corresponding one of the intake valves 38. The rocker arms 47 each drivingly open and close the exhaust valves 14 by swingably following a corresponding one of exhaust side cams 49 provided on the camshaft 45.

Valve lifters 46 are each formed like a bottomed cylinder whose upper end is closed. The valve lifter 46 is fitted the cylinder head 30A so as to slide in the axial direction coaxial with the operating axis of each of the intake valves 38. The stems 38*a* of the intake valves 38 are each abutted at an upper end against the closed end inner surface of the valve lifter 46. The intake side cams 48 are each abutted against a corresponding one of the closed end external surfaces of the valve lifters 46. A plug insertion tube 50 is attached to the cylinder head 30A. The plug insertion tube 50 is adapted to receive an ignition plug (not shown) inserted thereinto. The ignition plug is threadedly engaged with the cylinder head 30A so as to have a leading end facing the combustion chamber 34. The rocker arms 47 each disposed on either side of the plug insertion tube 50 are turnably supported by a rocker shaft 51 journaled by the cylinder head 30A so as to have an axis parallel to the camshaft 45. Rollers 52 are each turnably supported by one end of the rocker arm 47 so as to be in rolling-contact with the exhaust side cam 49. In addition, the rocker arms 47 are each abutted at the other end against the upper end of the stem 39*a* of the exhaust valve 39.

In such an SOHC type valve operating device 44, it is possible to set a relatively small angle α formed between the respective operational axes of each of the intake valves 38 and a corresponding one of the exhaust valves 39 in a view projected to a plane perpendicular to the axis of the crankshaft 26. In addition, it is possible to reduce the size of the cylinder head 30A by arranging the intake valves 38 and the exhaust valves 39 closer to each other.

In the state where the engine body 24A is mounted on the body frame F, the rotational power of the crankshaft 26 is transmitted to one end, a left end, of the camshaft 45 at a reduction ratio of ½ by a timing transmission mechanism 53. The timing transmission mechanism 53 includes a drive sprocket (not shown) provided on the crankshaft 26, a driven sprocket 55 secured to one end of the camshaft 45, and an endless cam chain 56 wound around the sprockets. In addition, the cylinder block 29 and the cylinder head 30A are formed with a cam chain chamber 57 in which the cam chain 56 is made to run. In the state where the engine body 24A is mounted on the body frame F, the cam chain chamber 57 is located on the left end of the cylinder block 29 and of the cylinder head 30A.

A single intake port 58 is provided in the cylinder head 30A so as to commonly-communicate with the intake valve ports 36. An intake side connection pipe 59 is provided integrally with the cylinder head 30A so as to form part of each of the intake ports 58 and to project reward from the rear lateral surface of the cylinder head 30A. A throttle body 61 is disposed rearward of the cylinder head 30A to form an intake passage 60 communicating with the intake ports 58. The throttle body 61 is connected to the intake side connection pipe 59 via an insulator 62. A throttle valve 63 is turnably supported by the throttle body 61 to change the opening area of the intake passage 60. In addition, a fuel injection valve 64 is mounted to the throttle body 61 to inject fuel toward the intake port 58.

A single exhaust port 65 is provided in the cylinder head 30A so as to commonly-communicate with the exhaust valve ports 37. An exhaust side connection pipe 66 is provided integrally with the cylinder head 30A so as to form part of the exhaust port 65 and to project forward from the front lateral surface of the cylinder head 30A. An exhaust pipe 68 communicating via an upstream end with the exhaust port 65 is connected to the exhaust side connection pipe 66 so as to form an exhaust passage 67 including the exhaust port 65. An exhaust muffler 69 (see FIG. 1) is connected to the downstream end of the exhaust pipe 68. In this way, a portion of the cylinder head 30A integrally including the exhaust side connection pipe 66 and the exhaust pipe 68 constitute exhaust passage forming means 70 cooperatively forming the exhaust passage 67.

The exhaust side connection pipe 66 is integrally provided to merge with the cylinder head 30A in such a manner that a portion of the exhaust port 65 forms a bent portion 65*a* bending as a whole although the bent portion 65*a* partially has a straight portion 65*aa*. In the state where the engine main body 24A is mounted on the body frame F, the bent portion 65*a* horizontally bends so as to convexly protrude toward one of the left and right directions of the motorcycle, i.e., toward the right direction in the embodiment. In addition, the bent portion 65*a* is integrally joined to the cylinder head 30A so as to be formed to bend leftward posteriorly to the down frame 18 while avoiding the down frame 18 which is disposed forward of the cylinder bead 30A so as to constitute part of the body frame F.

The upstream end of the exhaust pipe 68 is joined to the exhaust side connection pipe 66. The exhaust pipe 68 includes a hanging pipe portion 68*a*, a first rising pipe portion 68*b* and a second rising pipe portion 68*c* in order to increase its length. As shown in FIG. 1, the hanging pipe portion 68*a* extends slightly leftward in the extending direction of the exhaust side connection pipe 66 and extends downward while turning forward of the down frame 18. The first rising pipe portion 68*b* bends rightward from the lower end of the hanging pipe portion 68*a* and extends rightward and obliquely upwardly. The second rinsing pipe portion 68*c* bends leftward from the rear end of the first rinsing pipe portion 68*b* and extends rearward and slightly rearward upwardly while approaching the widthwise central side of the body frame F.

Figure 4:
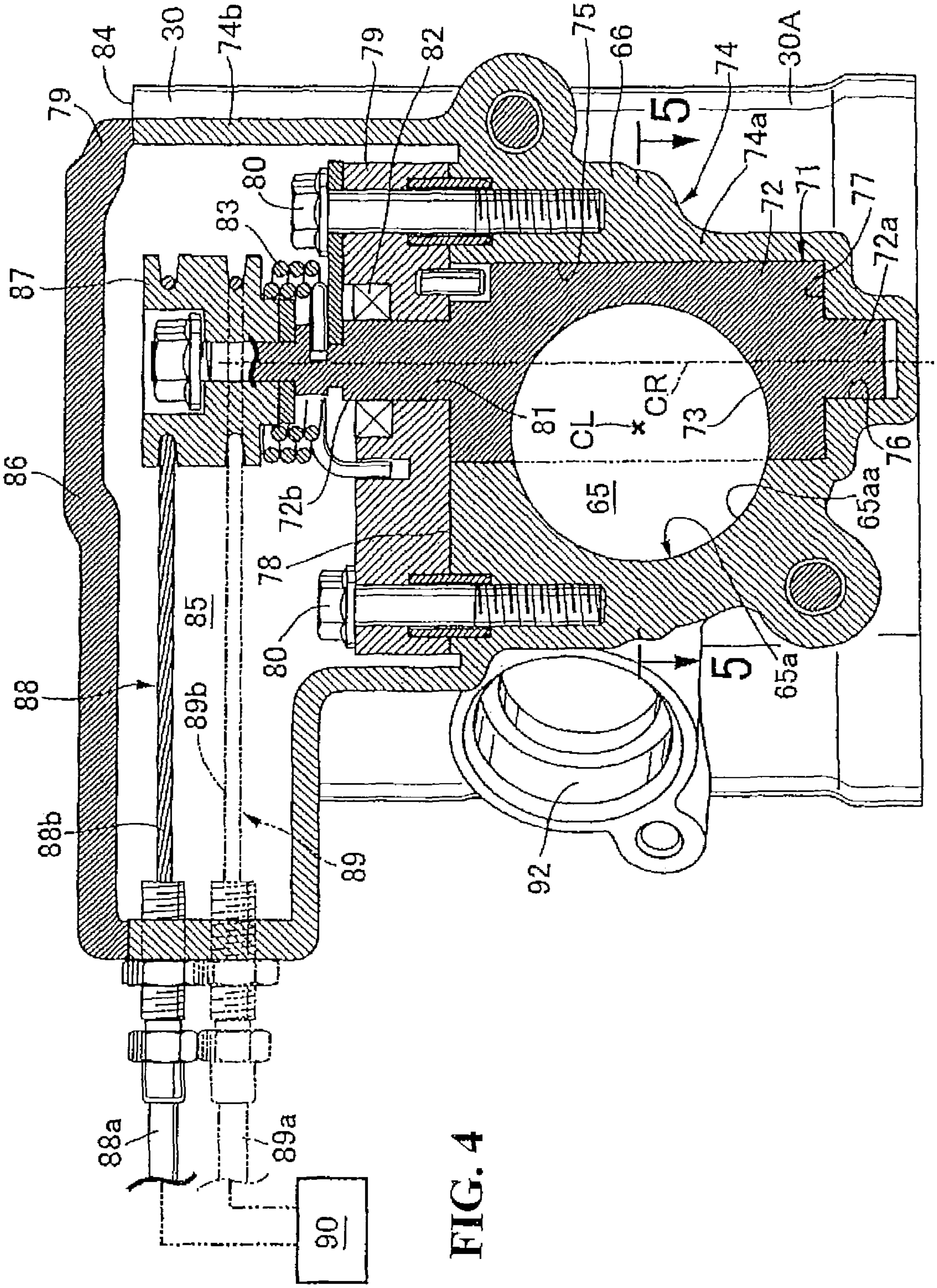
FIG. 4 is a cross-sectional view taken along line 4-4 of FIG. 3.

With additional reference to FIG. 4, the passage sectional area of the bent portion disposed at a position closed to the exhaust valve ports 37 of the exhaust passage 67, i.e., the bent portion 65*a* formed by a portion of the exhaust port 65 is changed by a rotary valve 71 which is an exhaust control valve. As can be seen in FIGS. 2 and 4, the rotary valve 71 has a turning axis CR which is vertically oriented and orthogonal with respect to a crankshaft 26 and is disposed at the straight portion 65*aa* of the bent portion 65*a*.

Figure 5A:
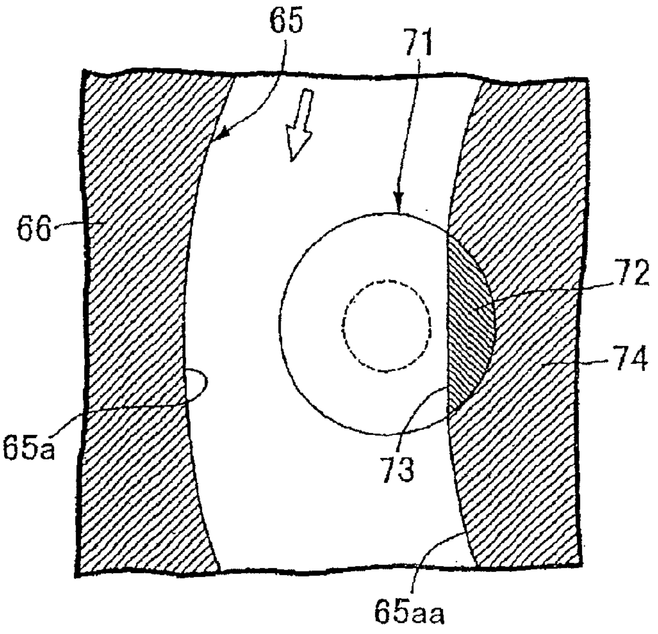
FIGS. 5(*a*) and 5(*b*) are cross-sectional views of a rotary valve fully opened and closed, respectively, taken along line 5-5 of FIG. 4.
Figure 5B:
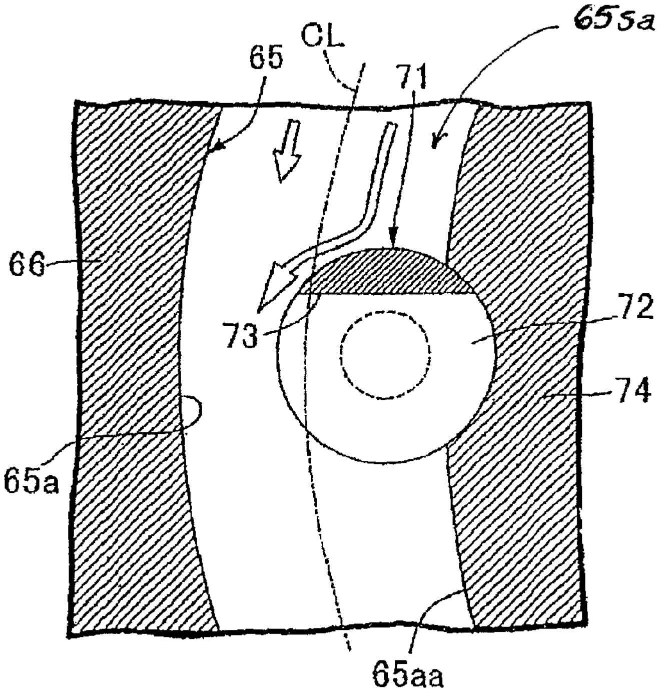

As can be seen in FIGS. 2, 5(*a*), and 5(*b*), rotary valve 71 (i.e., the exhaust control valve 71) is disposed in the exhaust side connection pipe 66 of the cylinder head 30A such that when closed, a portion of the rotary valve 71 is caused to protrude into the exhaust port 65 from the inner wall thereof in the exhaust passage 67, thereby changing the bent-internal side partial passage cross-sectional area of the exhaust side connection pipe 66, at a part 65*sa* of the of the bent portion 65*a* closest to the exhaust valve port 37. More specifically, the rotary valve 71 having a turning axis CR vertically oriented generally parallel to the axis CB of the cylinder bore 28 is disposed at a position offset toward the bent-internal side from the center CL of the bent portion 65*a*. That is to say, in the embodiment, the rotary valve 71 is disposed at a position opposite to the down frame 18 and offset toward the cam chain chamber 57 from the center CL of the exhaust port 65.

The rotary valve 71 is formed such that a passage portion 73 constituting part of the exhaust port 65 cuts away a portion of the valve body 72 when fully opened as shown in FIGS. 4 and 5(*a*). The valve body 72 has a columnar external shape with the turning axis CR centered. The valve body 72 is provided at both ends with turning shaft portions 72*a*, 72*b* integrally therewith, coaxially therewith and projectingly therefrom. In addition, the turning shaft portions 72*a*, 72*b* are coaxial with the turning axis CR. When the rotary valve 71 is closed, the external surface of the rotary valve 71, i.e., a portion of the external surface of the valve body 72 protrudes from the inner wall of the exhaust port 65 in the exhaust passage 67 as shown in FIG. 5(*b*).

In addition, since the valve body 72 is columnar, of the rotary valve 71 in the closed state, at least the protruding end side (from the internal wall) external surface that protrudes inside the exhaust passage 67 and faces the upstream side gradually increases the amount of protrusion from the inner wall as it goes from the upstream side of the exhaust passage 67 to the downstream side. In other words, in the embodiment, since the turning axis CR of the rotary valve 71 is located at a position traversing the exhaust passage 67, of the rotary valve 71, the protruding end side external surface that protrudes inside the exhaust passage 67 and faces the upstream side gradually increases the amount of protrusion from the inner wall. The portion located on the protruding end side and facing the upstream side bends in the same direction as the bending direction of the exhaust port 65 in the exhaust passage 67.

The rotary valve 71 is housed in a valve housing 74 provided integrally with the exhaust side connection pipe 66 integral with the cylinder head 30A. The valve housing 74 includes a housing portion 74*a* adapted to turnably house the valve body 72 and a box-like portion 74*b* integrally contiguous with the upper portion of the housing portion 74*a*. The box-like portion 74*b* extends from the housing portion 74*a* to the side opposite to the cam chain chamber 57 to form a rectangle with the upper portion opened.

The housing portion 74*a* is provided with a housing hole 75 and with a bottomed lower support hole 76. The housing hole 75 vertically traverses the straight portion 65*aa* of the bent portion 65*a* in the exhaust port 65 at a portion close to the cam chain chamber 56. The bottomed lower support hole 76 is formed to have a diameter smaller than that of the housing hole 75 and is coaxially contiguous with the housing hole 75. An annular lower support surface 77 is formed between the housing hole 75 and the lower support hole 76 to face the upside. The upper end of the housing hole 75 opens to a flat joint surface 78 which is formed at the upper end of the housing portion 74*a* to face the inside of the box-like portion 74*b*. A pressing member 79 is joined to the joint surface 78 with a plurality of, e.g., a pair of, bolts 80, 80 so as to grip the valve body 72 of the rotary valve 71 between the lower support surface 77 and the pressing member 79.

The valve body 72 is inserted from above into the housing hole 75 such that the turning shaft portion 72*a* is turnably fitted into the lower support hole 76. The pressing member 79 is fastened to the joint surface 78 while pressing the valve body 72 from above. The pressing member 79 is provided with an upper support hole 81 adapted to receive the turning shaft portion 72*b* of the valve body 72 turnably passed therethrough. An annular seal member 82 is interposed between the pressing member 79 and the turning shaft portion 72*b*.

A return spring 83 is provided between the turning shaft portion 72*b* of the rotary valve 71 and the pressing member 79. The turning shaft portion 72*b*, namely, the rotary valve 71 are biased by the spring force of the return spring 83 to the opening valve side, that is, to the turning position side where the passage portion 73 is continuously flush with the inner surface of the exhaust port 65 as shown in FIGS. 5(*a*) and 5(*b*).

The upper end surface of the valve housing 74, i.e., the upper end surface of the box-like portion 74*b* is formed to be flush with the Joint surface 84 of the cylinder head 30A to the head cover 31. A lid member 86 is fastened to the upper end surface of the box-like portion 74*b* to define an operation chamber 85 between the valve housing 74 and the lid member 86.

A drum 87 is secured to the turning shaft portion 72*b* of the rotary valve 71 in the operation chamber 85. One end of a closing side cable 88 adapted to turn the rotary valve 71 in the valve-closing side when the cable 88 is pulled and one end of an opening side cable 89 adapted to turn the rotary valve 71 in the valve-opening side when pulled are wound around and engaged with the drum 87 from the respective sides opposite to each other.

The closing side cable 88 is composed of an outer cables 88*a* and an inner cable 88*b* inserted into the outer cable 88*a*. Similarly, the opening side cable 89 is composed of an outer cable 89*a* and an inner cable 89*b* inserted into the outer cable 89*a*. One end of each of the outer cables 88*a*, 89*a* is secured to the lateral wall of the box-like portion 74*b* at a position isolated from the drum 87. One end of the inner cable 88*b* projecting from one end of the outer cable 88*a* and one end of the inner cable 89*b* projecting from one end of the outer cable 89*a* are connected to the drum 87.

On the other hand, the other ends of the closing side cable 88 and opening side cable 89 are connected to an actuator 90 which has a reversible electric motor and is carried by the body frame F. The closing side cable 88 is pulled by the actuator 90 to turn the rotary valve 71 in the valve-closing direction. The opening side cable 89 is pulled by the actuator 90 to turn the rotary valve 71 in the valve-opening side.

A water outlet 92 is provided in the front lateral surface of the cylinder head 30A to lead cooling water from a water jacket 91 provided in the cylinder block 29 and cylinder head 30A toward the radiators 25 disposed forward of the engine body 24A. The water outlet 92 is disposed on the side opposite to the cam chain chamber 57 with respect to the exhaust port 65.

In FIG. 1, a water pump 94 is mounted to outer surface of a right cover 93 fastened to the right lateral surface of the crankcase 27. The water pump 94 is driven by the power transmitted from the crankshaft 26. A pipe conduit 95 adapted to lead cooling water from the lower portions of the radiators 25 is connected to the water pump 94. On the other hand, cooling water discharged from the water pump 94 is led to the lower portion of the water jacket 91 through the right cover 93, the crankcase 27 and the cylinder block 29. The water outlet 92 provided in the cylinder head 30A so as to be contiguous with the upper portion of the water jacket 91 is connected to the upper portions of the radiators 25 via a pipe conduit 96.

Figure 6:
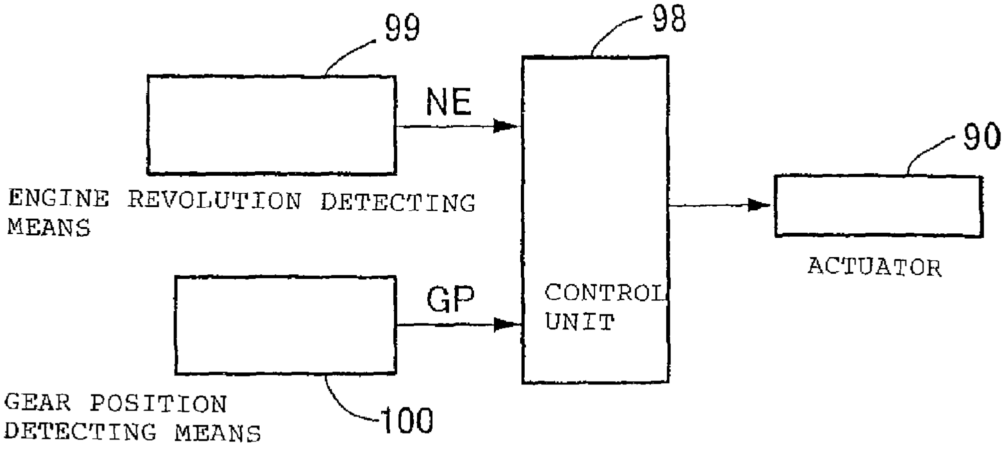
FIG. 6 is a block diagram illustrating a control system for the rotary valve.

Referring to FIG. 6, the operation of the actuator 90 is controlled by a control unit 98. The control unit 98 receives engine revolutions NE detected by an engine revolution detector 99 and a transmission gear position GP detected by a gear position detector 100. The control unit 98 controls the operation of the actuator 90 to open or close the rotary valve 71 on the basis of the engine revolutions NE and of the gear position GP. Incidentally, throttle opening may be used instead of the engine revolutions NE or both the engine revolutions NE and the throttle opening may be used.

The control unit 98 controls the actuator 90 so that the rotary valve 71 is brought into the fully opened state during the high-speed operation of the engine and into the fully closed state where the passage sectional area of the exhaust port 65 in the exhaust passage 67 is closed more than half (e.g. 57%) thereof, during the mid- and low-speed operation of the engine.

The control unit 98 makes a determination as to whether or not the motorcycle is being decelerated on the basis of at least one of the engine revolutions NE and the throttle opening and of the gear position. If the control unit 98 determines that the motorcycle is being decelerated, it operates the actuator 90 to close the rotary valve 71 to apply the engine brake.

Further, the control unit 98 makes a determination as to whether or not the motorcycle is being suddenly-accelerated on the basis of at least one of the engine revolutions NE and the throttle opening and of the gear position. If the control unit 98 determines that the motorcycle is being suddenly accelerated, it controls the actuator 91 to temporarily close the rotary valve 71 to temporarily suppress the engine power.

A description is next given of the operation of the first embodiment. The rotary valve 71 changes the bent-internal side partial passage sectional area of the passage cross-sectional area at the bent portion closest to the exhaust valve ports 37 of the exhaust passage 67 formed by the exhaust passage forming means 70, i.e., at the bent portion 65*a* of the exhaust port 65. In this way, the rotary valve 71 is disposed at a portion where an exhaust flow rate is high, even on the bent-internal side and close to the combustion chamber 34. Thus, an exhaust control effect can be produced at a maximum without enlargement of the rotary valve 71. In the state where the rotary valve 71 is closed, exhaust flows only on the bent-outer side where the exhaust flow rate is high, at the bent portion 65*a*. It is possible to reduce the amount of exhaust by the rotary valve 71 while keeping the exhaust flow rate. In addition, it is possible to suppress the occurrence of turbulent flow by reducing the turbulence of exhaust flowing on the bent-external side, thereby enabling satisfactory exhaust control. In addition, since the rotary valve 71 is located at a position close to the combustion chamber 34, it is possible to suppress the blow-by of fresh air resulting from the pressure control inside the combustion chamber 34 by the rotary valve 71 and from the overlapping of the opening timing of the exhaust valves 39 and the intake valves 38.

In addition, the bent portion 65*a* of the exhaust port 65 partially has the straight portion 65*aa* which linearly extends and the rotary valve 71 is disposed at the straight portion 65*aa*. Thus, the shape of the rotary valve 71 is simplified to facilitate the machining of the rotary valve 71, which can enhance exhaust controllability by the rotary valve 71.

When fully opened, the rotary valve 71 is continuously flush with the inner surface of the exhaust port 65 in the exhaust passage 67; therefore, it will not reduce the sectional area of the exhaust port 65 in the exhaust passage 67 when fully opened. The control unit 98 which controls the actuator 90 to operatively open and close the rotary valve 71 controls the actuator 90 so that the rotary valve 71 is brought into the fully opened state during the high-speed operation of the engine and into the fully closed state where the passage sectional area of the exhaust port 65 in the exhaust passage 67 is closed half or more thereof (e.g., 57%) during the mid- and low speed operation of the engine.

Figure 7:
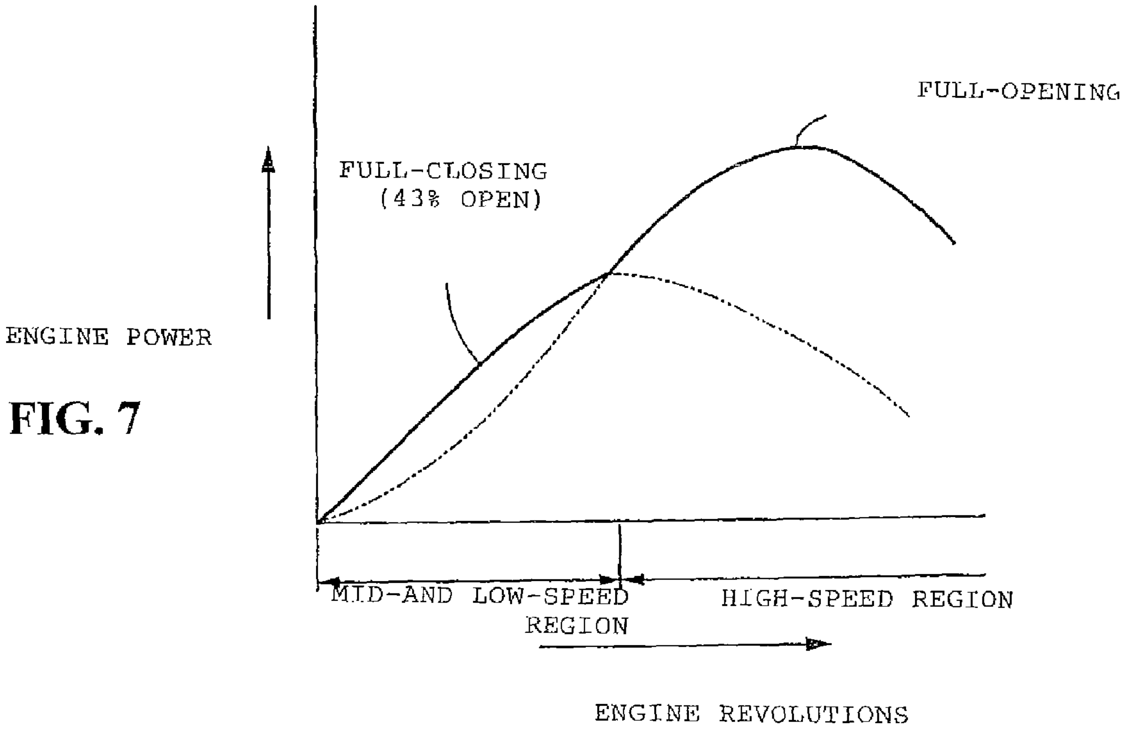
FIG. 7 illustrates power change along with the opening change of the rotary valve.

When the exhaust port 65 is brought into the fully opened state or into the fully closed state where the passage sectional area of the exhaust port 65 is closed half or more (e.g. 57%) thereof, the engine power is changed as shown in FIG. 7 along with the change of the operation state of the engine. During the high-speed operation, it is possible to improve the discharge of exhaust from the combustion chamber 34 without reduction in the sectional area of the exhaust port 65 in the exhaust passage 67 so that fresh air can be caused to effectively flow in the combustion chamber 34, thereby improving combustion efficiency. In addition, during the mid- and low-speed operation, the pressure in the combustion chamber 34 is increased to improve engine power while making the discharge of exhaust from the combustion chamber 34 slow to prevent the blow-by of fresh air.

The control unit 98 controls the operation of the actuator 90 to open or close the rotary valve 71 on the basis of at least one of the engine revolutions NE and the throttle opening and of the gear position. Thus, it is possible to optimally exercise the opening-closing control on the rotary valve 71 conforming to at least one of throttle opening, i.e., an index indicating the state of the combustion chamber 34 and the engine revolutions NE, and the gear position of the transmission.

The control unit 98 makes a determination as to whether or not the motorcycle is being decelerated. If it determines that the motorcycle is being decelerated, the actuator 90 is operated to close the rotary valve 71 so as to apply the engine brake. Thus, the rotary valve 71 to improve the engine power can apply the engine brake during the deceleration.

Further, the control unit 98 makes a determination as to whether or not the motorcycle is being suddenly-accelerated. If it determines that the motorcycle is being suddenly-accelerated, the actuator 90 is operated to temporarily close the rotary valve 71 so as to temporarily suppress the engine power. Thus, during the sudden-acceleration, the grip of the wheel can be made good by temporarily closing the rotary valve 71 to temporary lower the power without impairing acceleration-operational feeling.

The rotary valve 71 has the turning axis CR at a position offset from the center CL of the exhaust port 65 so as to partially protrude into the exhaust port 65 from the inner wall of the exhaust port 65 when closed. Therefore, the opened area of the exhaust port 65 can be made relatively large even when the rotary valve 71 is closed. Of the rotary valve 71 in the closed state, at least the protruding end side (from the internal wall) external surface of the external surface that protrudes inside the exhaust passage 67 and faces the upstream side, in this embodiment, the amount of protrusion (from the inner wall) of the protruding end side external surface, gradually increases as it goes from the upstream side of the exhaust passage 67 to the downstream side. The portion located on the protruding end side and facing the upstream side bends in the same direction as the bending direction of the exhaust port 65 in the exhaust passage 67. Thus, even if the exhaust flow rate is high, the exhaust can be allowed to smoothly flow along the surface of the rotary valve 71 as indicated with arrow of FIG. 5(*b*), which prevents the occurrence of turbulent flow on the surface of the rotary valve 71, thereby realizing the satisfactory exhaust control by opening or closing the rotary valve 71.

In the rotary valve 71, the valve body 72 having the columnar external shape with the turning axis CR centered is formed such that the passage portion 73 constituting part of the exhaust port 65 cuts away a portion of the valve body 72 when the rotary valve 71 is fully opened. Thus, the workability of the rotary valve 71 can be enhanced.

Further, the rotary valve 71 can change the opening area of the exhaust port 65 provided in the cylinder head 30A. In addition, the rotary valve 71 is turnably provided in the exhaust side connection pipe 66 of the cylinder head 30A at a position offset from the center CL of the exhaust port 65 toward the cam chain chamber 57. Although the rotary valve 71 with relatively large weight is disposed in the cylinder head 30A, it is provided on the side close to the cam chain chamber 57 which is a cavity. Thus, it is possible to appropriately set the weight balance of the engine body 24A and it is not necessary to replace the rotary valve 71 when the exhaust pipe 68 is replaced.

In addition, since the rotary valve 71 is provided in the exhaust side connection pipe 66 on the side opposite to the down frame 18, it can be prevented from interfering with the down frame 18. Further, the rotary valve 71 is disposed in the cylinder head 30A on the side close to the cam chain chamber 57. The valve operating device 44 includes the camshaft 45 disposed above the intake valves 38; the pair of valve lifters 46 each interposed between a corresponding one of the pair of intake side cams 48 provided on the camshaft 45 and a corresponding one of the intake valves 38; and the pair of rocker arms 47 each drivingly open and close the exhaust valves 39 by swingably following a corresponding one of exhaust side cams 49 provided on the camshaft 45 and is configured as an SOHC type. Thus, the rotary valve 71 will not interfere with the driven sprocket 55 provided on the camshaft 45 so as to correspond to the cam chain chamber 57.

The water outlet 92 adapted to lead the cooling water from the cylinder head 30A toward the radiators 25 disposed forward of the engine body 24A is provided on the front lateral surface of the cylinder head 30A on the side opposite to the cam chain chamber 57 with respect to the exhaust port 65. Thus, the rotary valve 71 can be disposed so as not to interfere with the pipe conduit 96 connected to the water outlet 92.

In the valve operating device 44 which drivingly opens and closes the intake valves 38 and the exhaust valves 39, the exhaust side cams 49 provided on the camshaft 45 disposed above the intake valves 38 are interlocked with and connected to the exhaust valves 39 via the rocker arms 47 swinging following the exhaust side cams 49. In such a valve operating device 44, it is possible to set the relatively small angle α formed between the respective operational axes of each of the intake valves 38 and a corresponding one of the exhaust valves 39 in a view projected to a plane perpendicular to the axis of the crankshaft 26. In addition, it is possible to reduce the size of the cylinder head 30A by arranging the intake valves 38 and the exhaust valves 39 closer to each other. Since the turning axis CR of the rotary valve 71 is set generally parallel to the axis CB of the cylinder bore 28 in the cylinder block 29, the engine body 24*a* can be made compact in the directions perpendicular to the axes of the cylinder bore 28 and the crankshaft 26.

In addition, the rotary valve 71 can turnably be housed in the valve housing 74 provided integrally with the exhaust side connecting pipe 66 integral with the cylinder head 30A. Therefore, it is not necessary to especially prepare a valve housing adapted to house the rotary valve 71 therein, thereby reducing the number of component parts.

In the state where the engine body 24A is mounted on the body frame F, the exhaust side connection pipe 66 is integrally provided to merge with the cylinder head 30A in such a manner that the bent portion 65*a* convexedly protrudes in the right direction of the motorcycle and bends in the horizontal direction. The rotary valve 71 is housed in the valve housing 74 with the turning axis CR vertically oriented. Thus, it is possible to avoid interference of the valve housing 74 with the cylinder head 30A. The turning shaft portions 72*a*, 72*b* of the rotary valves 71 is isolated from the combustion chamber 34 to be prevented from being raised to a high temperature. The drum 87 which is a drive mechanism for driving the rotary valve 71, the closing side cable 88 and the opening side cable 89 are arranged above the valve housing 74; therefore, they can easily be protected from stones or the like flying from below.

The valve housing 74 is provided integrally with the exhaust side connection pipe 66 integral with the cylinder head 30A so as to open upward so that the rotary valve 71 can be assembled thereto from above. The upper end surface of the valve housing 74 is formed flush with the joint surface 84 of the cylinder head 30A to the head cover 31. Thus, it is possible to make the workability of the valve housing 74 satisfactory and to facilitate the assembly of the valve housing 74 to the rotary valve 71.

Further, the engine body 24A is configured such that the axis CB of the cylinder bore 28 is disposed to be offset from the axis CC of the crankshaft 26 in the turning direction 35 of the crankshaft 26. It is possible to suppress wear resulting from the piston 32 coming into slidable contact with the inner surface of the cylinder bore 28. This can prevent the cylinder block 29 and the combustion chamber 34 from being raised to higher temperatures. Thus, it is possible to further reduce a thermal influence on the rotary valve 71 provided in the exhaust port 65.

Figure 8:
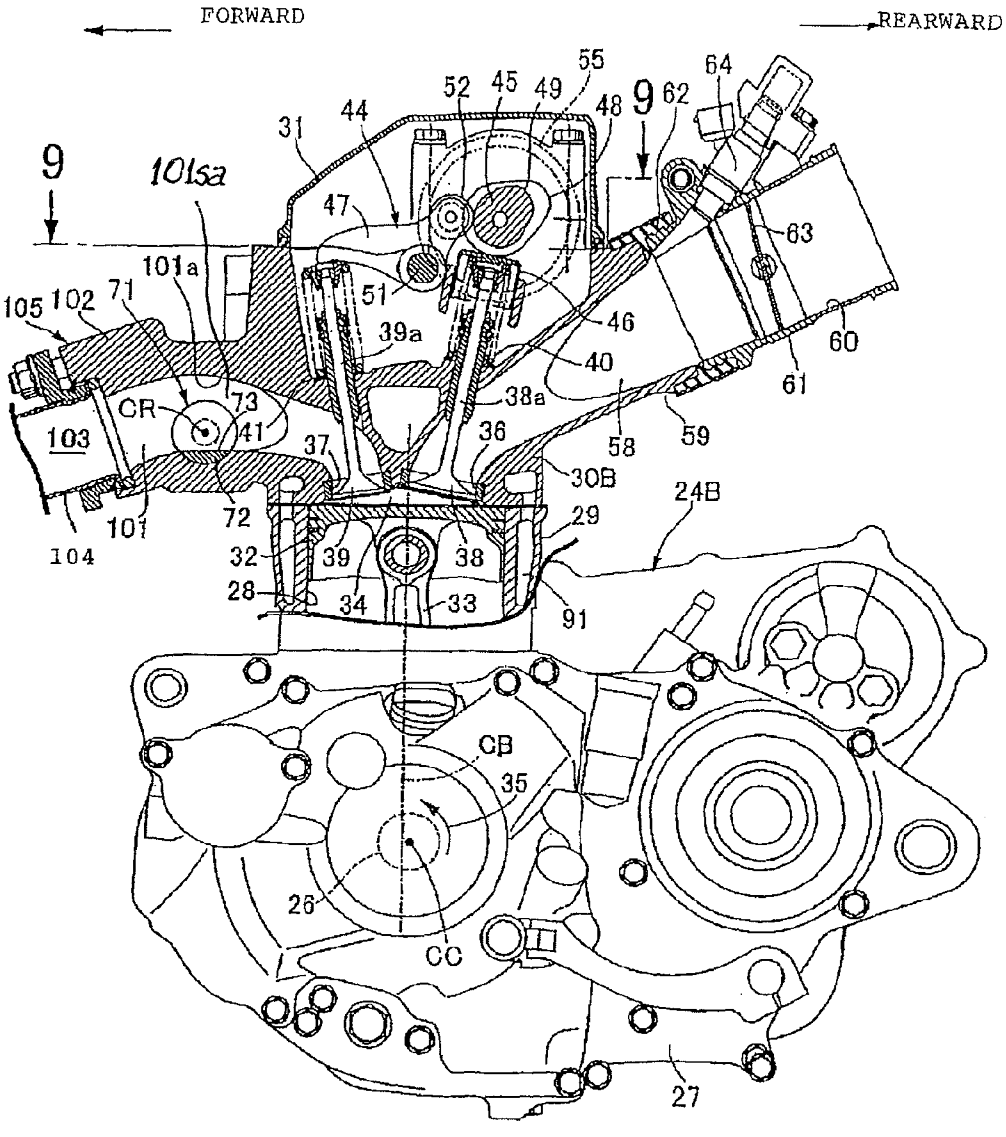
FIG. 8 is a longitudinal cross-sectional left-lateral view corresponding to FIG. 2, illustrating a second embodiment.
Figure 9:
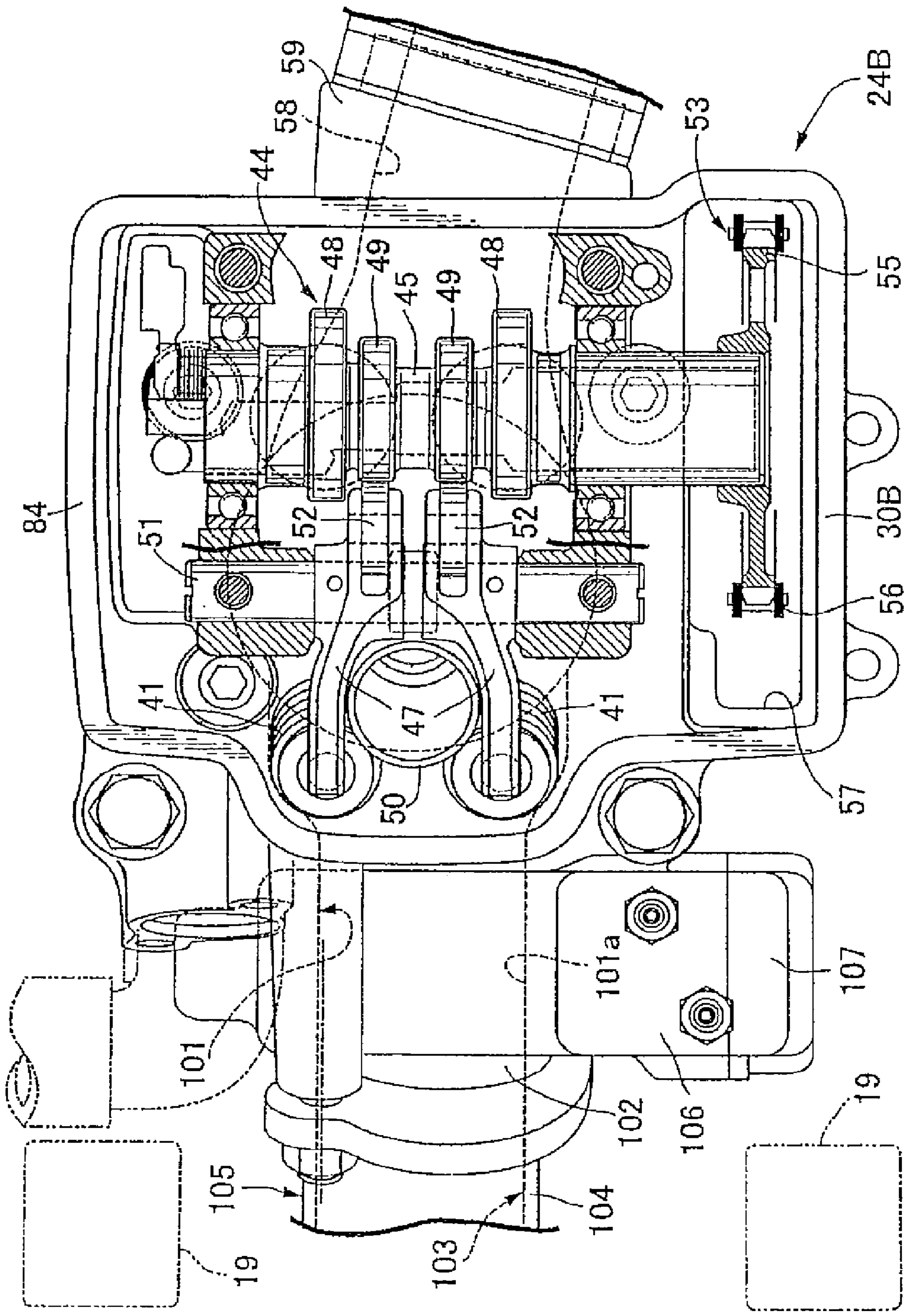
FIG. 9 is an enlarged cross-sectional view taken along line 9-9 of FIG. 8.
Figure 10A:
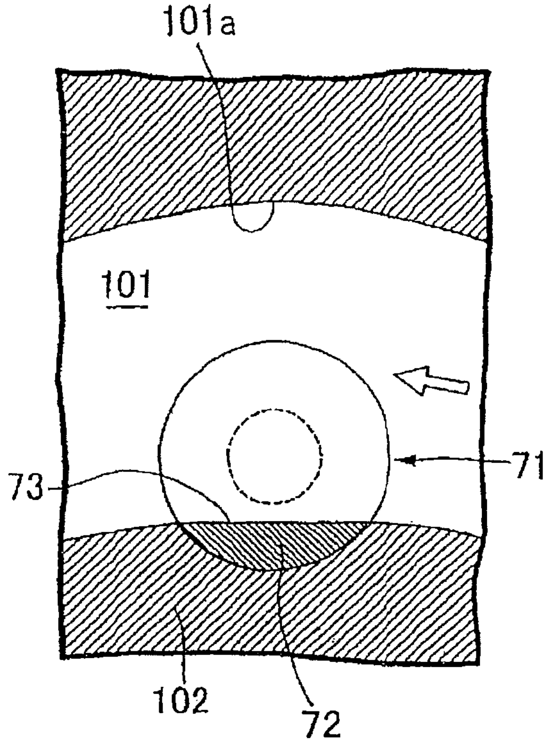
FIGS. 10(*a*) and 10(*b*) are enlarged views of an essential portion of a rotary valve in FIG. 8, for assistance in explaining respective states when the valve is fully opened FIG. 8 and when fully closed FIG. 8.
Figure 10B:
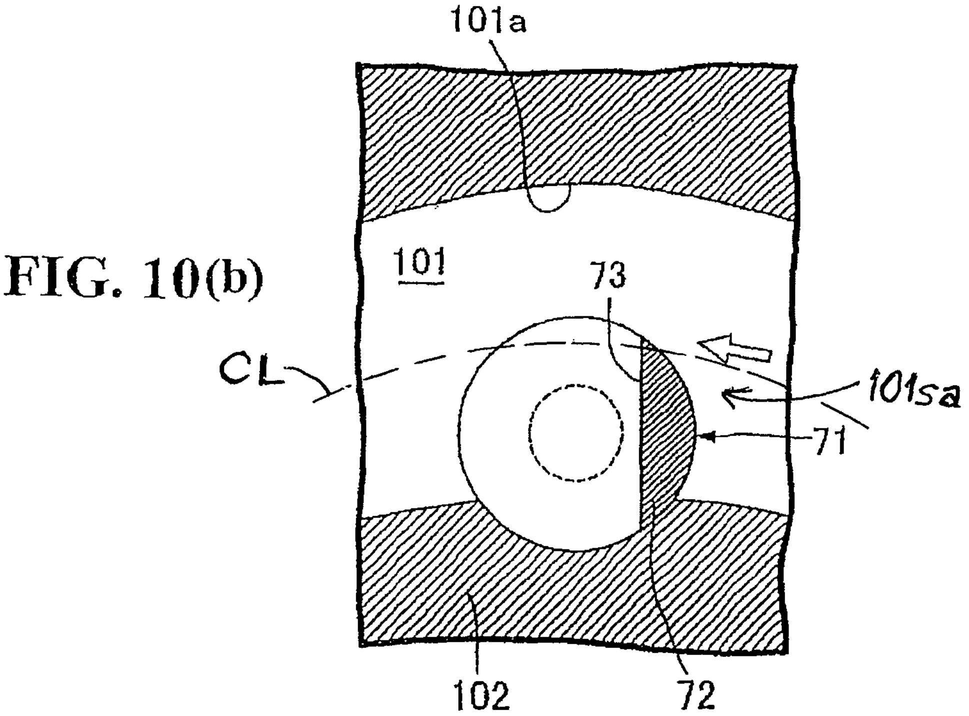

FIGS. 8 through 10(*a*) and 10(*b*) illustrate a second embodiment of the present invention. FIG. 8 is a longitudinal cross-sectional left-lateral view of a 4-cycle engine corresponding to that of FIG. 2. FIG. 9 is an enlarged cross-sectional view taken along line 9-9 of FIG. 8. FIGS. 10(*a*) and 10(*b*) are enlarged views of an essential portion of a rotary valve in FIG. 8, for assistance in explaining respective states, when the valve is fully opened FIG. 10(*a*) and when fully closed FIG. 10(*b*).

Incidentally, the portions corresponding to those of the first embodiment are only indicated with like reference numerals and their explanations are omitted.

An engine body 24B includes a crankcase 27, a cylinder block 29, a cylinder head 30B, and a head cover 31. The crankcase 27 rotatably supports a crankshaft 26 with an axis extending in the left-right direction of the motorcycle. The cylinder block 29 has a cylinder bore 28 and is joined to the upper portion of the crankcase 27. The cylinder head 30B is joined to the upper portion of the cylinder block 29. The head cover 31 is joined to the upper portion of the cylinder head 30B.

A single exhaust port 101 is provided on the cylinder head 30B so as to commonly-communicate with the exhaust valve ports 37. An exhaust side connection pipe 102 is provided integrally with the cylinder head 30B so as to form part of the exhaust port 101 and to project forward from the front lateral surface of the cylinder head 30B. An exhaust pipe 104 communicating via an upstream end with the exhaust port 101 is connected to the exhaust side connection pipe 102 so as to form an exhaust passage 103 including the exhaust port 101 cooperatively with the exhaust side connection pipe 102. A portion of the cylinder head 30B integrally including the exhaust side connection pipe 102 and the exhaust pipe 104 constitute exhaust passage forming means 105 cooperatively forming the exhaust passage 103.

The exhaust side connection pipe 102 is integrally provided to merge with the cylinder head 30B in such a manner that the exhaust port 101 is partially formed with a bent portion 101*a*. In the state where the engine body 24A is mounted on the body frame F, the bent portion 101*a* expands upwardly convexedly and bends vertically. In addition, the exhaust side connection pipe 102 is provided integrally with the cylinder head 30B in such a manner as to bend downwardly between a pair of left and right lower frames 19, 19 constituting part of the body frame F.

The bent-internal side passage sectional area of the bent portion closest to the exhaust valve ports 37 of the exhaust passage 103, i.e., of the bent portion 101*a* in the exhaust port 101 is changed by a rotary valve 71 which is an exhaust control valve.

As can be seen in FIGS. 8, 10(*a*), and 10(*b*), the rotary valve 71 (i.e., the exhaust control valve 71) is disposed in the exhaust side connection pipe 102 of the cylinder head 30B in such a manner that when closed, a portion of the rotary valve 71 is caused to protrude into the exhaust port 101 from the inner wall thereof in the exhaust passage 103, thereby changing the bent-internal side partial passage sectional area of the exhaust side connection ape 102, at a part of the bent portion 101*a* closest to the exhaust valve port 37. More specifically, the rotary valve 71 is disposed in the exhaust side connection pipe 102 so as to have a turning axis CR horizontally oriented in the left-right direction of the motorcycle at a position offset from the center CL of the bent portion 101*a*.

The rotary valve 71 is formed such that a passage portion 73 constituting part of the exhaust port 101 in the exhaust passage 103 cuts away a portion of the valve body 72 when fully opened as shown in FIGS. 8 and 10(*a*). The valve body 72 has a columnar external shape with the turning axis CR centered. When the rotary valve 71 is closed, a portion of the external surface of the rotary valve 71, i.e., of the external surface of the valve body 72 protrudes from the inner wall of the exhaust port 101 in the exhaust passage 103 as shown in FIG. 10(*b*). In addition, since the valve body 72 is columnar, of the external surface of the rotary valve 71, the portion located on the protruding end side external surface and facing the upstream side, when the rotary valve is closed, has the amount of protrusion from the inner wall which gradually increases as it goes from the upstream side of the exhaust port 101 to the downstream.

The rotary valve 71 is housed in a valve housing 106 provided integrally with the exhaust side connection pipe 102 integral with the cylinder head 30B. In addition, the valve housing 106 is provided integrally with the exhaust side connection pipe 102 to extend in the lateral direction of the motorcycle and a lid member 107 is fastened to the valve housing 106.

In this way, the rotary valve 71 is drivingly opened and closed by an actuator 90 (see the first embodiment) similarly to the first embodiment.

According to the second embodiment, the valve housing 106 adapted to house therein the rotary valve 71 which controls the bent-internal side opening area of the vertically bent exhaust port 101 is formed integrally with the exhaust side connection pipe 102 projectingly provided to be integral with the cylinder head 30B. The space between the cylinder head 3013 and cylinder block 29, and the exhaust side connection pipe 102 is effectively utilized to dispose the valve housing therein while avoiding the interference with the cylinder head 30B and with the cylinder block 29. Thus, the rotary valve 71 is isolated from the combustion chamber 34 to be prevented from being raised to a high temperature.

If the plurality of exhaust ports 101 are juxtaposed to each other in the cylinder head 30B, a plurality of the rotary valves 71 can be turned by a single turning shaft. Thus, the number of component parts can be reduced to simplify the exhaust control structure of each exhaust port 101.

Figure 11:
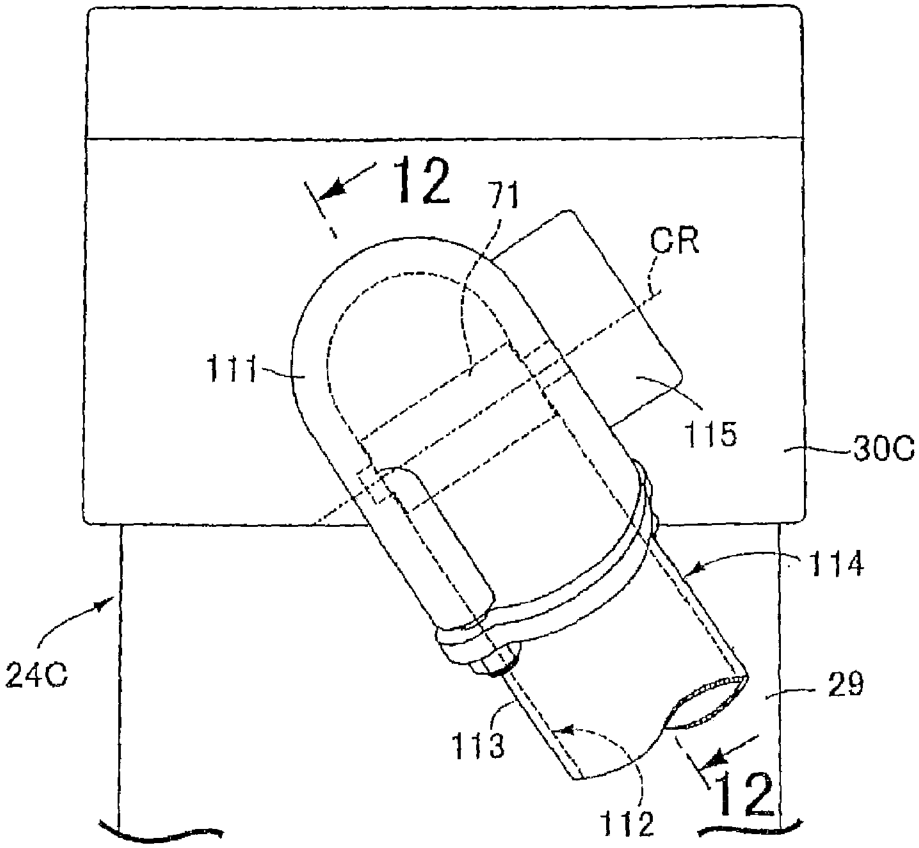
FIG. 11 is a schematic front view illustrating a cylinder head and a cylinder block according to a third embodiment.
Figure 12:
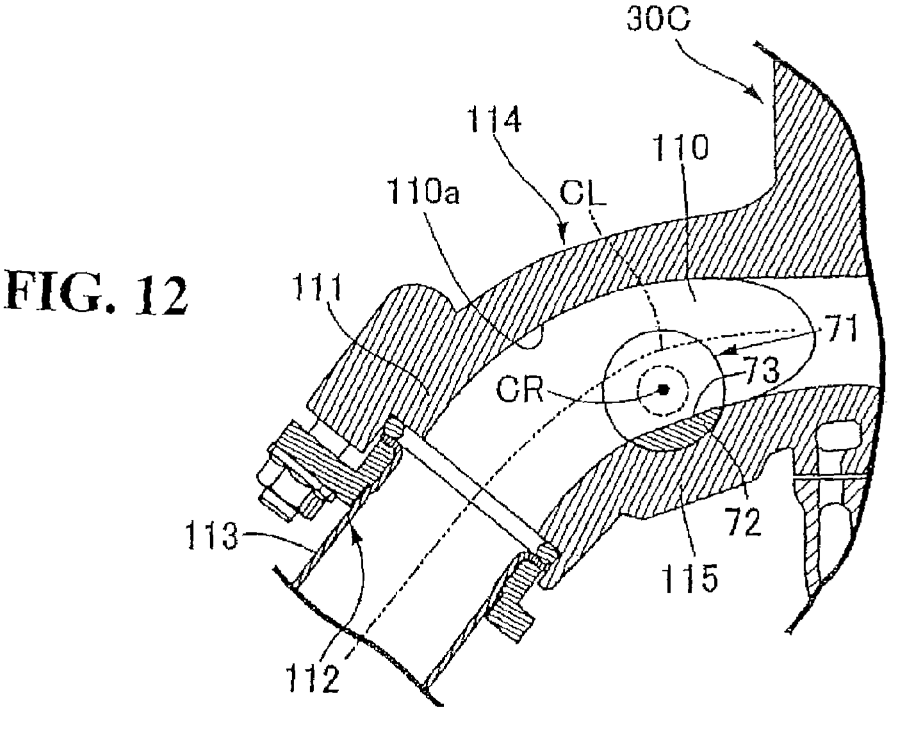
FIG. 12 is a cross-sectional view taken along line 12-12 of FIG. 11.

FIG. 11 is a schematic front view illustrating a cylinder head and a cylinder block according to a third embodiment. FIG. 12 is a cross-sectional view taken along line 12-12 of FIG. 11. Portions corresponding to those in first and second embodiments are indicated with like reference numerals and their detailed explanations are omitted.

An exhaust side connection pipe 111 forming part of an exhaust port 110 and protruding forward is integrally provided on the front lateral surface of the cylinder head 30C joined to the a cylinder block to constitute a portion of an engine body 24C. An exhaust pipe 113 is connected at an upstream end to the exhaust side connection pipe 111 so as to communicate with the exhaust port 110. The exhaust pipe 113 forms an exhaust passage 112 including the exhaust port 110 cooperatively with the exhaust side connection pipe 111. A portion of the cylinder head 30C integrally having the exhaust side connection pipe 111 and the exhaust pipe 113 constitute exhaust passage forming means 114 cooperatively forming the exhaust passage 112.

The exhaust side connection pipe 111 is integrally provided to merge with the cylinder head 30C in such a manner that the exhaust port 110 is partially formed with a bent portion 110*a*. The bent portion 110*a* bends so as to protrude upward toward one of the left and right of the motorcycle (the right in the embodiment). The passage sectional area of the bent portion located at a position closest to the exhaust valve ports 37 (see first and second embodiments) of the exhaust passage 112, i.e., of the bent portion 110*a* of the exhaust port 110, is changed by a rotary valve 71 which is an exhaust control valve.

The turning axis CR of the rotary valve 71 is set to be vertically inclined so that it is located on the other side (the right in the embodiment) of the left and right of the vehicle as it goes downward. The rotary valve 71 is turnably housed in a valve housing 115 provided integrally with the exhaust side connection pipe 111 on the bent-internal side of the bent portion 110*a*.

According to the third embodiment, it is possible to avoid the interference between the cylinder head 30C of the valve housing 115 and the cylinder block 29. In addition, the rotary valve 71 can be isolated from a combustion chamber 34 (see the first embodiment) to be prevented from being raised to a high temperature.

Figure 13:
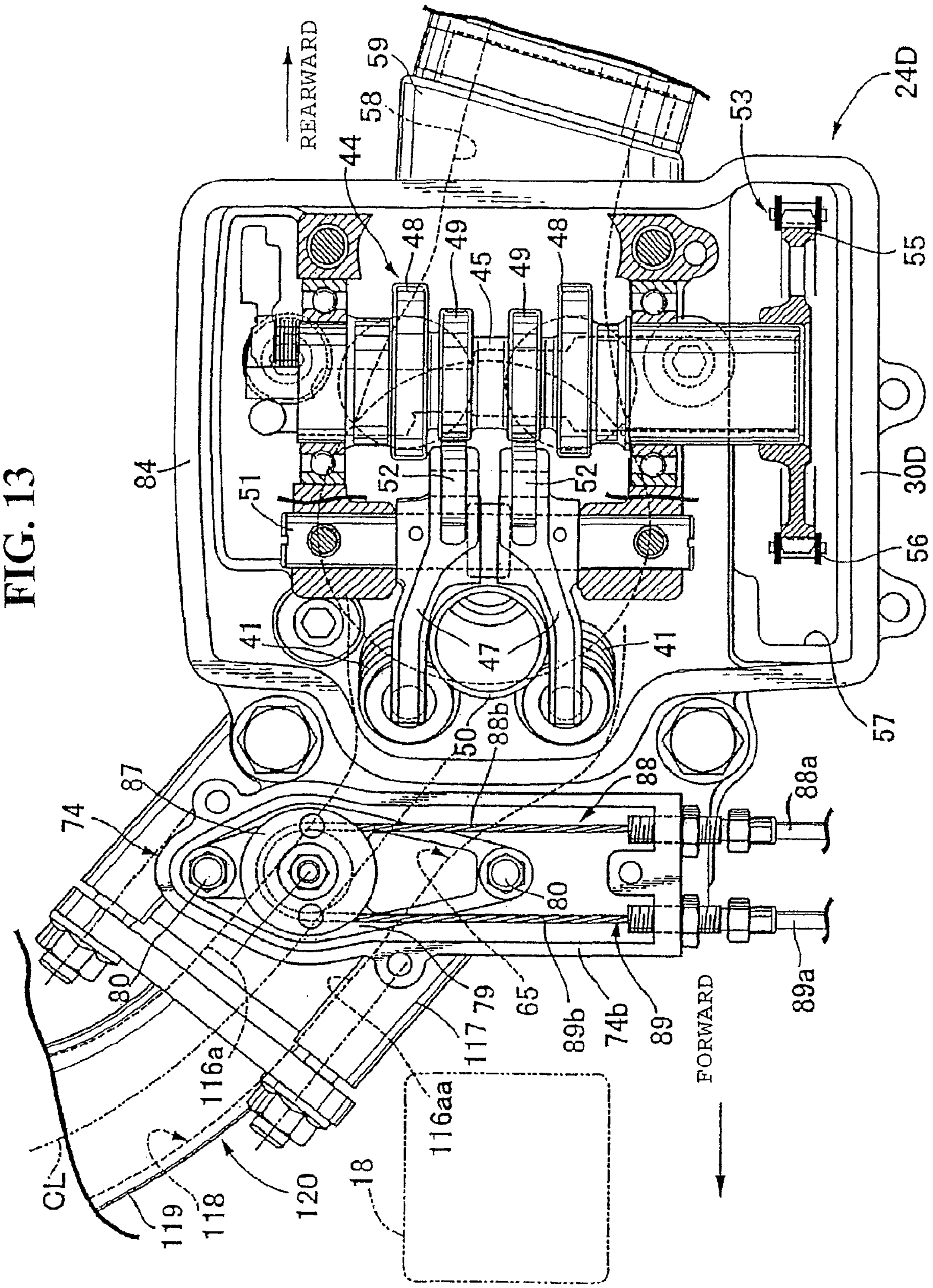
FIG. 13 is a cross-sectional view corresponding to FIG. 3 and illustrating a fourth embodiment.

FIG. 13 is a cross-sectional view corresponding to FIG. 3 and illustrating a fourth embodiment of the present invention. Portions corresponding to those in the first embodiment are indicated with like reference numerals and their detailed explanations are omitted.

A single exhaust port 116 is provided on a cylinder head 30D of an engine body 24D so as to commonly-communicate with the exhaust valve ports 37 (see the first embodiment). An exhaust side connection pipe 117 is provided integrally with the cylinder head 30D so as to form part of the exhaust port 116 and to project forward from the front lateral surface of the cylinder head 30D. An exhaust pipe 119 communicating via an upstream end with the exhaust port 116 is connected to the exhaust side connection pipe 117 so as to form an exhaust passage 118 including the exhaust port 116. In this way, a portion of the cylinder head 30D integrally including the exhaust side connection pipe 117 and the exhaust pipe 119 constitute exhaust passage forming means 120 cooperatively forming the exhaust passage 118.

The exhaust side connection pipe 117 is integrally provided to merge with the cylinder head 30D in such a manner that a portion of the exhaust port 116 forms a bent portion 116*a* bending as a whole although the bent portion 116*a* partially has a straight portion 116*aa*. In the state where an engine body 24D is mounted on a body frame F, the bent portion 116*a* horizontally bends so as to convexly protrude toward one of the left and right directions of the motorcycle, toward the left direction in the embodiment. In addition, the exhaust side connection pipe 117 is integrally provided to merge with the cylinder head 30D so as to be formed to bend rightward.

The passage sectional area of the bent portion located at a position closest to the exhaust valve ports 37 of the exhaust passage 118, i.e., the bent portion 116*a* formed by a portion of the exhaust port 116 is changed by a rotary valve 71 which is an exhaust control valve. This rotary valve 71 is disposed at the straight portion 116*aa* of the bent portion 116*a*.

The rotary valve 71 is disposed in the exhaust side connection pipe 117 of the cylinder head 30D in such a manner that when closed, a portion of the rotary valve 71 is caused to protrude into the exhaust port 116 from the inner wall thereof in the exhaust passage 118, thereby changing the bent-internal side partial passage sectional area. More specifically, the rotary valve 71 is disposed in the exhaust side connection pipe 117 so as to have a vertically-orienting turning axis CR at a position offset toward the bent-internal side from the center CL of the bent portion 116*a*, i.e., at a position offset on the side opposite to a cam chain chamber 57 from the center CL of the exhaust port 116 in this embodiment.

The rotary valve 71 is housed in a valve housing 74 provided integrally with the exhaust side connection pipe 117 integral with the cylinder head 30D. The valve housing 74 is formed to extend toward the cam chain chamber 57 reversely to the first embodiment. However, since the valve housing 74 has the same configuration as that of the first embodiment, portions corresponding to those of the first embodiment are indicated with like reference numerals and their detailed explanations are omitted.

According to the fourth embodiment, since the rotary valve 71 is disposed in the exhaust port 116, the passage sectional area of the exhaust port 116 will not be reduced when the rotary valve 71 is fully opened. In addition, although the relatively large rotary valve 71 is disposed in the exhaust side connection pipe 117 of the cylinder head 30D, the rotary valve 71 is disposed in the exhaust side connection pipe 117 at a position offset from the center CL of the exhaust port 116 toward the side opposite to the cam chain chamber 57. Thus, it is easy to avoid the interference between the rotary valve 71 and a driven sprocket 55 provided on the cam shaft 45 to constitute part of the timing transmission mechanism 53. This can downsize the cylinder head 30D.

Figure 14:
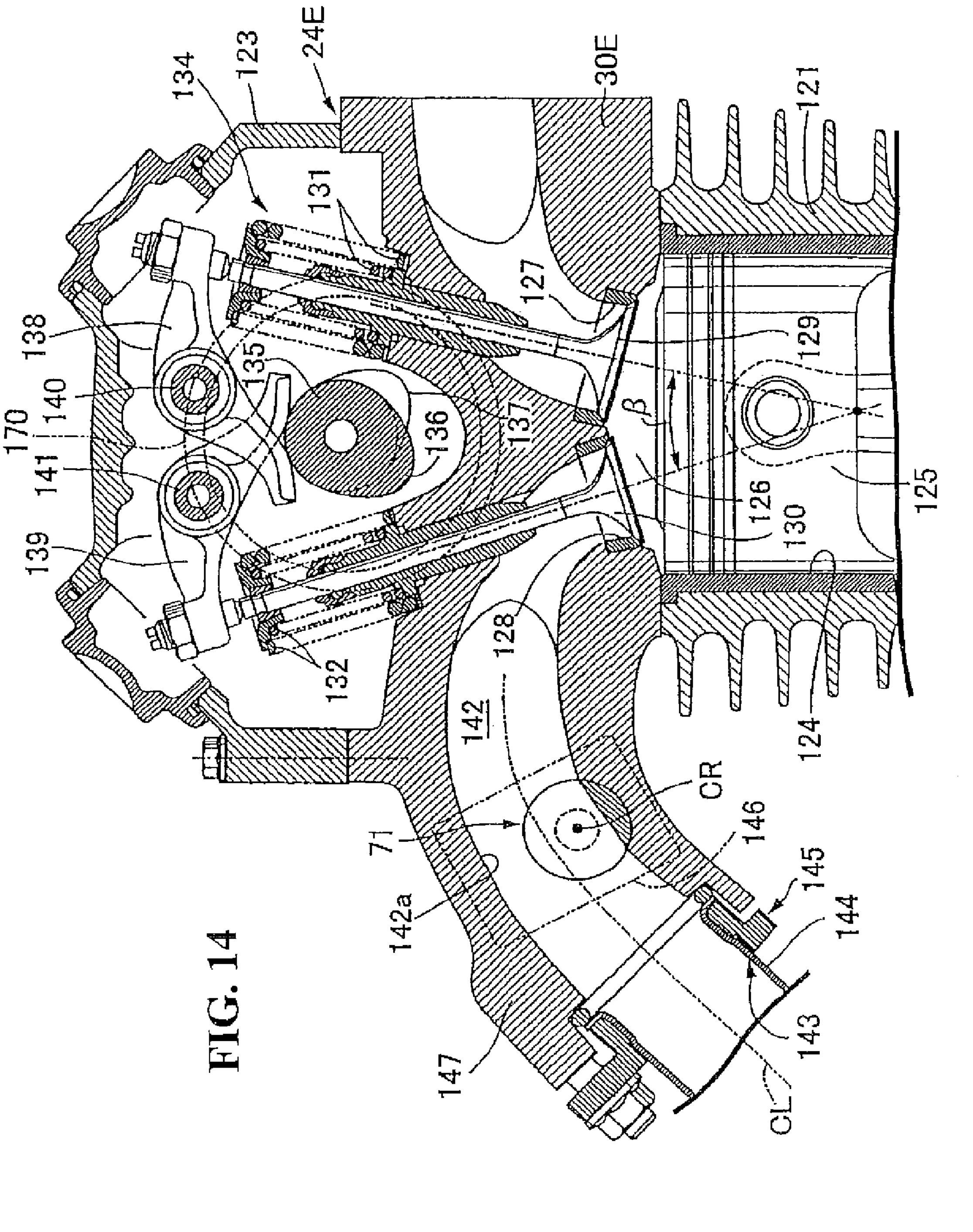
FIG. 14 is a longitudinal cross-sectional view illustrating an essential portion of an engine body according to a fifth embodiment.

FIG. 14 is a longitudinal cross-sectional view illustrating an essential portion of an engine body according to a fifth embodiment of the present invention. A combustion chamber 126 is defined between a cylinder block 121 and a cylinder head 30E constituting part of the engine body 24E. The combustion chamber 126 is faced by the top of a piston 125 slidably fitted into a cylinder bore 124 of the cylinder block 121. A pair of intake valve ports 127 and a pair of exhaust valve ports 128 are provided in the cylinder head 30E so as to face the combustion chamber 126. A pair of intake valves 129 individually opening and closing the corresponding intake valve ports 127 and a pair of exhaust valves 130 individually opening and closing the corresponding exhaust valve ports 128 are arranged on the cylinder head 30E so as to enable opening and closing operation. Both the intake valves 129 are biased by respective valve springs 131 in the valve-closing direction and both the exhaust valves 130 are biased by respective valve springs 132 in the valve-closing direction.

A valve operating device 134 for drivingly opening and closing the intake valves 129 and the exhaust valves 130 is housed between the cylinder head 30E and the head cover 123 fastened to the cylinder head 30E. The valve operating device 134 includes a camshaft 135, a pair of intake side rocker arms 138 and a pair of exhaust side rocker arms 139 and is configured as an SOHC type. The camshaft 135 is disposed between the intake valves 129 and the exhaust valves 130 and is rotatably carried by the cylinder head 30E. The intake side rocker arms 138 drivingly open and close the intake valves 129 by swingably following the respective intake side cams 136 provided on the camshaft 135. The exhaust side rocker arms 139 drivingly open and close the exhaust valves 130 by swingably following the respective exhaust side cams 137 provided on the camshaft 135. The intake side rocker arms 138 and the exhaust side rocker arms 139 are swingably carried by respective rocker shafts 140, 141 parallel to the cam shaft 135. A driven sprocket 170 constituting part of the timing transmission mechanism is secured to the cam shaft 135.

In such an SOHC type valve operating device 134, it is possible to set a relatively large angle β formed between the respective operational axes of each of the intake valves 129 and a corresponding one of the exhaust valves 130 in a view projected to a plane perpendicular to the axis of the crankshaft 26. This can reduce the size of the cylinder head 30E in the direction of the axis of the cylinder bore 124.

A single exhaust port 142 is provided on the cylinder head 30E so as to commonly-communicate with the exhaust valve ports 128. An exhaust side connection pipe 147 is provided integrally with the cylinder head 30E so as to form part of the exhaust port 142 and to project forward from the front lateral surface of the cylinder head 30E. An exhaust pipe 144 is connected at an upstream end to the exhaust side connection pipe 147 so as to form an exhaust passage 143 including the exhaust port 142 cooperatively with the exhaust side connection pipe 147. A portion of the cylinder head 30E integrally including the exhaust side connection pipe 147 and the exhaust pipe 144 constitute exhaust passage forming means 145 cooperatively forming the exhaust passage 143.

The exhaust side connection pipe 147 is integrally provided to merge with the cylinder head 30E in such a manner that a portion of the exhaust port 142 forms a bent portion 142*a*. In the state where the engine body is mounted on the body frame, the bent portion 142*a* upwardly expands and vertically bends. The exhaust side connection pipe 147 is integrally provided to merge with the cylinder head 30E so as to be formed to bend downwardly.

The bent-internal partial passage sectional area of the bent portion disposed at a position closest to the exhaust valve ports 128 of the exhaust passage 143, i.e., the bent portion 142*a* of the exhaust port 142 is changed by a rotary valve 71 which is an exhaust control valve.

The rotary valve 71 is disposed in the exhaust side connection pipe 147 of the cylinder head 30E in such a manner that when closed, a portion of the rotary valve 71 is caused to protrude into the exhaust port 142 from the inner wall thereof in the exhaust passage 143, thereby changing the bent-internal side partial passage sectional area of the bent portion 142*a*. More specifically, the rotary valve 71 is disposed in the exhaust side connection pipe 147 so as to have a turning axis CR oriented in the left-right direction of the motorcycle at a position offset from the center CL of the bent portion 142*a*. In this way, the rotary valve 71 is housed in a valve housing 146 provided integrally with the exhaust side connection pipe 147 integral with the cylinder head 30E.

According to the fifth embodiment, the engine body 24E can be downsized in the direction along the axis of the cylinder bore 124. The valve operating device 134 is configured as an SOHC type which does not have a driven sprocket dedicated to the exhaust valves 130. A driven sprocket 170 is secured to a camshaft 135 disposed between the intake valves 129 and the exhaust valves 130. Thus, although the valve housing 146 is configured to be provided integrally with the cylinder head 30E, it can be avoided that the rotary valve 71 interferes with the driven sprocket 170 while downsizing the cylinder head 30E.

Incidentally, if the valve operating device is configured as a DOHC type, a driven sprocket is provided on the exhaust side camshaft. A rotary valve is disposed on the bent-internal side of the exhaust passage forming means forming a vertically bent exhaust passage. Thus, the interference can be avoided between the rotary valve and the driven sprocket.

In the first through fifth embodiments, of a portion, of the rotary valve 71 in the closed state, protruding inside the exhaust passage, an external surface portion that faces the upstream side of the exhaust passage is not smoothly continuous with the internal wall of the exhaust passage. However, such an external surface portion can smoothly be continuous with the internal wall of the exhaust passage by appropriately selecting the setting position of the turning axis CR of the rotary valve 71. In this way, the occurrence of turbulent flow can effectively be suppressed by allowing exhaust gas to smoothly flow on the surface of the rotary valve 71 in the closed state.

Figure 15:
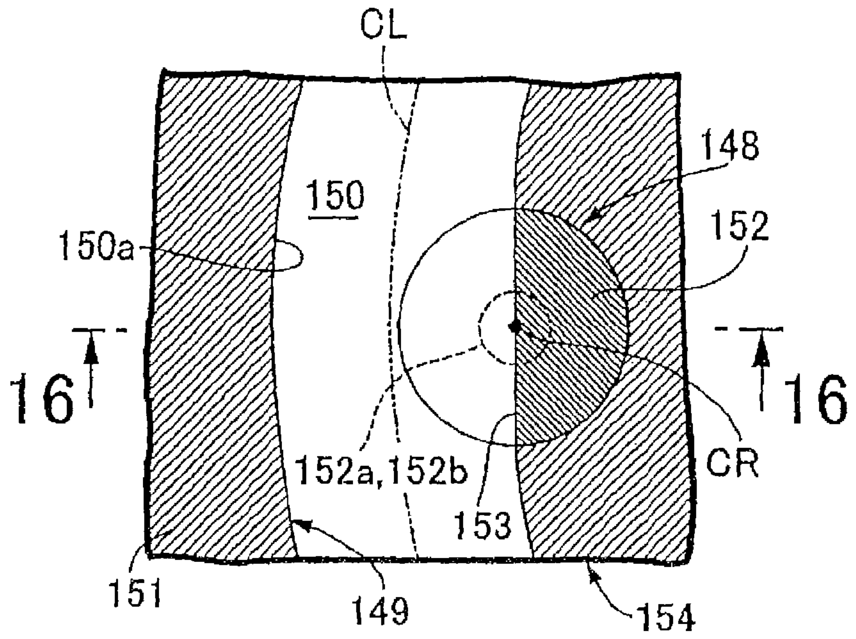
FIG. 15 is a cross-sectional view corresponding to FIG. 5(*a*) and illustrating a rotary valve of a first modification.
Figure 16:
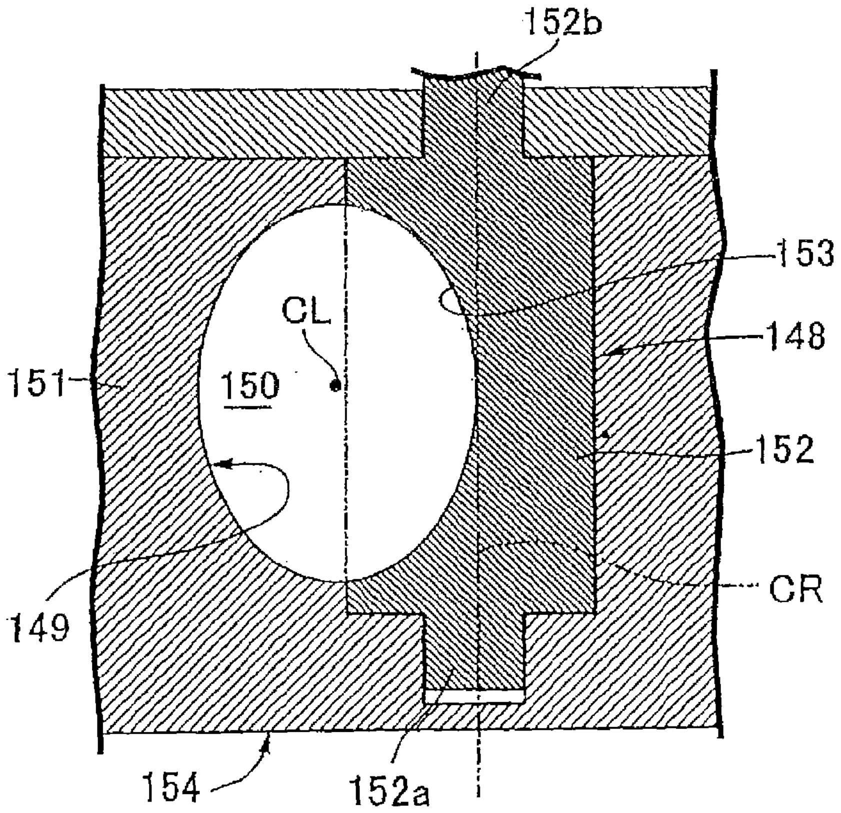
FIG. 16 is a cross-sectional view taken along line 16-16 of FIG. 15.

FIGS. 15 and 16 illustrate a rotary valve of a first modification. FIG. 15 is a cross-sectional view of the rotary valve corresponding to that of FIGS. 5(*a*) and 5(*b*). FIG. 16 is a cross-sectional view taken along line 16-16 of FIG. 15.

The rotary valve 148 is such that when closed, it is caused to partially protrude into an exhaust port 150 from the inner wall of a bent portion 150*a* of the exhaust port 150 in the exhaust passage 149 formed by exhaust passage forming means 154, thereby changing the bent-internal side partial passage sectional area of the bent portion 150*a*. In addition, the rotary valve 148 is disposed in an exhaust side connection pipe 151 constituting part of the exhaust passage forming means 154 by forming part of the exhaust port 150. Specifically, the rotary valve 148 is disposed in the exhaust side connection pipe 151 so as to have a turning axis CR located at a position offset on the bent-internal side from the center CL of the bent portion 150*a*.

The rotary valve 148 is formed such that a passage portion 153 constituting part of the exhaust port 150 that cuts away a portion of a valve body 152 when fully opened is formed in the valve body 152. The valve body 152 has a columnar external shape with the turning axis CR centered. The valve body 152 is provided at both ends with turning shaft portions 152*a*, 152*b* integrally therewith, coaxially therewith and projectingly therefrom.

In addition, at least a portion of the exhaust passage 149 where the rotary valve 148 is disposed, i.e., the bent portion 150*a* of the exhaust port 150, is formed in an ellipse in transverse cross-section. The passage portion 153 of the rotary valve 148 is formed contiguously flush with a circumferential portion of the inner wall of the exhaust port 150 when the rotary valve is fully opened.

With such a rotary valve 148, while keeping a sectional area of the exhaust port in the exhaust passage, i.e., a sectional area shielded by the rotary valve 148, the residual portion of the valve body 152 other than a portion where the passage portion 153 is formed is enlarged to increase the strength of the rotary valve 148.

Figure 17A:
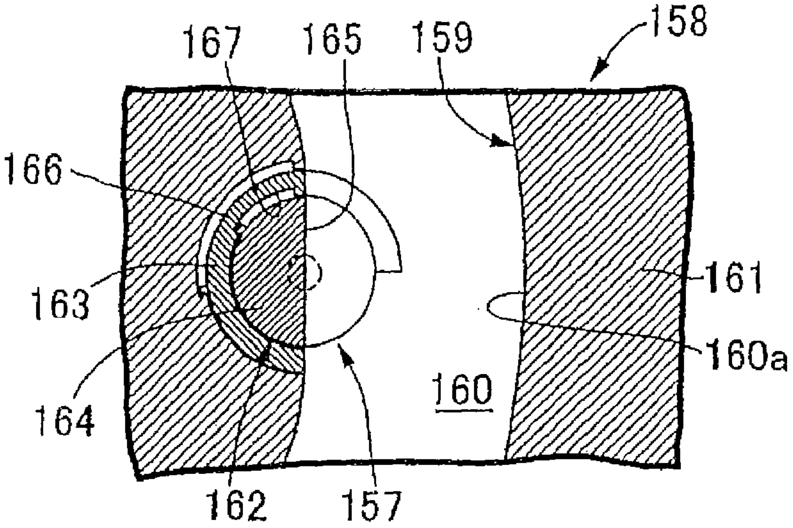
FIGS. 17(*a*) to 17(*c*) are cross-sectional views corresponding to FIG. 15 and illustrating a rotary valve of a second modification.
Figure 17B:
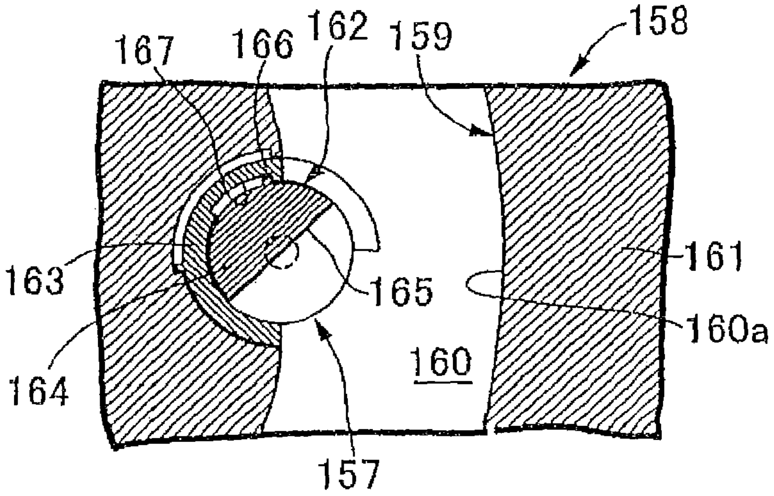
Figure 17C:
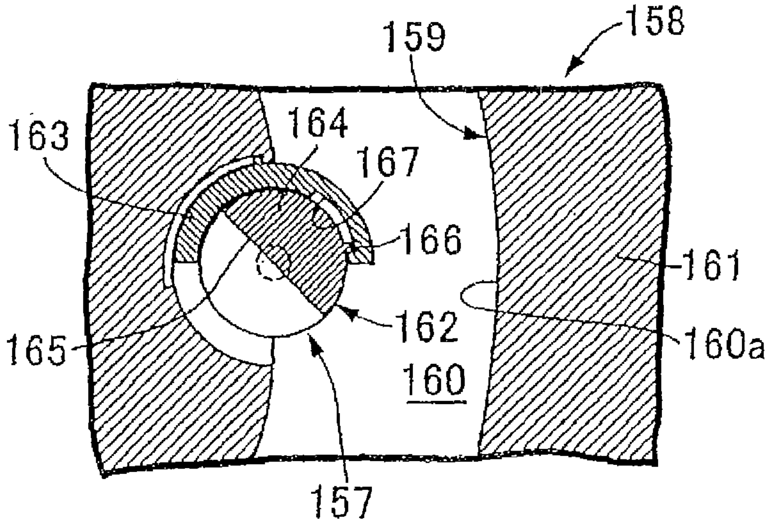

FIGS. 17(*a*) to 17(*c*) are cross-sectional views illustrating a rotary valve of a second modification corresponding to that of FIG. 15.

The rotary valve 157 is such that when closed, it is caused to partially protrude into an exhaust port 160 from the inner wall of a bent portion 160*a* of the exhaust port 160 in the exhaust passage 159 formed by exhaust passage forming means 158, thereby changing the bent-internal side partial passage sectional area of the bent portion 160*a*. In addition, the rotary valve 157 is disposed in an exhaust side connection pipe 161 constituting part of the exhaust passage forming means 158 by forming part of the exhaust port 160. Specifically, the rotary valve 157 is disposed in the exhaust side connection pipe 161 so as to have a turning axis CR located at a position offset on the bent-inner side from the center CL of the bent portion 160*a*.

The rotary valve 157 is composed of an inner rotor 162 turnably supported by the exhaust side connection pipe 161 and an outer rotor 163 interlocked with and connected to the inner rotor 162 so as to operate in retard of the inner rotor 162, and turnably supported by the inner rotor 162.

The inner rotor 162 is formed such that a passage portion 165 constituting part of the exhaust port 160 in the exhaust passage 159 is formed in the valve body 164 to cut away a portion of the valve body 164 when fully opened. The valve body 164 has a columnar external shape with the turning axis CR centered. The outer rotor 163 is formed to have a circular arc in transverse cross-section surrounding a general semicircle of the inner rotor 162.

A projection 166 is provided to project from an external circumference, of the valve body 164 in the inner rotor 162, e.g., on the side opposite to the passage portion 165 in order to allow the inner rotor 162 and the outer rotor 163 to interlock and connect with each other. On the other hand, the outer rotor 163 is formed in the inner circumference with a recessed portion 167 that elongates along the circumferential direction of the inner rotor 162 so as to receive the projection 166 slidably fitted thereinto.

When the rotary valve 148 is fully opened, as shown in FIG. 17(*a*), the inner rotor 162 is located at a position where the passage portion 165 is continuously flush with the inner surface of the exhaust port 160. In addition, the projection 166 is brought into abutment against one circumferential end of the recessed portion 167 so that the outer rotor 163 may not protrude into the exhaust port 160. When the rotary valve 148 is closed, the inner rotor 162 is turned around the turning axis CR so as to partially protrude into the exhaust port 160. However, as shown in FIG. 17(*b*), the outer rotor 163 does not protrude into the exhaust port 160 until the projection 166 comes into abutment against the other circumferential end of the recessed portion 167. When the inner rotor 162 is further turned in the valve-closing direction from the state of FIG. 17(*b*), the projection 166 is abutted against the other circumferential end of the recessed portion 167; therefore, the outer rotor 163 is turned to protrude into the exhaust port 160 while being pressed by the projection 166. In this way, the closed area of the exhaust port 160 is further enlarged compared with when the inner rotor 162 is fully closed.

According to the rotary valve 157 of the second modification as above, the passage portion 165 of the inner rotor 162 is made relatively small while a portion of the area, of the passage portion, needed as the entire rotary valve 157 is borne by the inner rotor 162. Thus, the strength of the entire rotary valve 157 can be increased by increasing the strength of the inner rotor 162 and by reinforcing the outer rotor 163 by the inner rotor 162.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust control device in an engine of a vehicle, comprising:

a cylinder head, an exhaust side connection pipe having a bent portion formed integrally with the cylinder head, an exhaust valve provided in a portion of the cylinder head facing combustion chamber, an exhaust valve port provided in a portion of the cylinder head facing a combustion chamber, the exhaust valve port being openable and closable by an exhaust valve, an exhaust control valve having a columnar-shaped valve body provided in the bent portion of the exhaust side connection pipe, wherein the exhaust control valve is formed with a passage portion which cuts away a portion of the valve body, and which constitutes part of the exhaust side connection pipe when the exhaust control valve is rotated to a fully open position, wherein when the exhaust control valve is rotated to a fully open position, the exhaust control valve is continuously flush with an inner surface of the bent portion of the exhaust side connection pipe, and when the exhaust control valve is rotated to a closed position, a portion of an external surface of the valve body protrudes from the inner surface of the bent portion of the exhaust side connection pipe, whereby the exhaust side connection pipe is partially closed.

2. The exhaust control device for an engine of a vehicle according to claim 1, wherein the exhaust control valve is a rotary valve whose external surface is continuously flush with the inner surface of the bent portion of the exhaust side connection pipe when fully opened and is smoothly continuous with the inner surface of the bent portion of the exhaust side connection pipe on an upstream side of the exhaust control valve when closed; and further comprising a control unit adapted to control an actuator which operatively opens and closes the exhaust control valve to bring the exhaust control valve into a fully opened state during a high-speed operation of the engine, and into a fully closed state where a passage sectional area of the bent portion of the exhaust side connection pipe is closed half or more during a mid- and low-speed operation of the engine.

3. The exhaust control device for an engine of a vehicle according to claim 2, wherein the control unit controls operation of the actuator to open or close the exhaust control valve based on at least one of a throttle opening and engine revolutions, and of a gear position of a transmission.

4. The exhaust control device for an engine of a vehicle according to claim 3, wherein the control unit is adapted to make a determination as to whether or not the vehicle is being decelerated, and if deceleration is determined, the control unit operates the actuator to close the exhaust control valve for applying engine brake.

5. The exhaust control device for an engine of a vehicle according to claim 3, wherein the control unit is adapted to make a determination as to whether or not the vehicle is being suddenly-accelerated, and if sudden acceleration is determined, the control unit operates the actuator to temporarily close the exhaust control valve for temporarily suppressing engine power.

6. The exhaust control device for an engine of a vehicle according to claim 1, wherein the exhaust control valve has a turning axis (CR) vertically oriented generally parallel to an axis (CB) of a cylinder bore, and is disposed at a position offset toward a bent-internal side from a center (CL) of the bent portion.

7. The exhaust control device for an engine of a vehicle according to claim 1, wherein the bent portion is integrally joined to the cylinder head so as to be formed to bend leftward posteriorly to a down frame of the vehicle while avoiding the down frame which is disposed forward of the cylinder head.

8. The exhaust control device for an engine of a vehicle according to claim 1, wherein the exhaust control valve disposed in the exhaust side connection pipe so as to have a turning axis (CR) horizontally oriented in a left and right direction of the vehicle at a position offset from a center (CL) of the bent portion.

9. The exhaust control device for an engine of a vehicle according to claim 8, wherein the exhaust side connection pipe is integrally formed with the cylinder head in such a manner that an exhaust port is partially formed with the bent portion.

10. The exhaust control device for an engine of a vehicle according to claim 8, wherein the exhaust side connection pipe is provided integrally with the cylinder head in such a manner as to bend downwardly between a pair of left and right lower frames constituting part of a body frame of the vehicle.

11. An exhaust control device in an engine of a vehicle, comprising:

a cylinder head, an exhaust port having a bent portion formed integrally with the cylinder head, an exhaust valve provided in a portion of the cylinder head facing combustion chamber, an exhaust valve port provided in a portion of the cylinder head facing a combustion chamber, the exhaust valve port being openable and closable by an exhaust valve, an exhaust control valve having a columnar-shaped valve body provided in the bent portion of the exhaust port, wherein the exhaust control valve is formed with a passage portion which cuts away a portion of the valve body, and which constitutes part of the exhaust port when the exhaust control valve is rotated to a fully open position, wherein when the exhaust control valve is rotated to a fully open position, the exhaust control valve is continuously flush with an inner surface of the bent portion of the exhaust port, and when the exhaust control valve is rotated to a closed position, a portion of an external surface of the valve body protrudes from the inner surface of the bent portion of the exhaust port, whereby the exhaust port is partially closed.

12. The exhaust control device for an engine of a vehicle according to claim 11, wherein the exhaust control valve is a rotary valve whose external surface is continuously flush with an inner surface of the bent portion of the exhaust port when fully opened and is smoothly continuous with the inner surface of the bent portion of the exhaust port on an upstream side of the exhaust control valve when closed; and further comprising a control unit adapted to control an actuator which operatively opens and closes the exhaust control valve to bring the exhaust control valve into a fully opened state during a high-speed operation of the engine, and into a fully closed state where a passage sectional area of the bent portion of the exhaust port is closed half or more during a mid- and low-speed operation of the engine.

13. The exhaust control device for an engine of a vehicle according to claim 12, wherein the control unit controls operation of the actuator to open or close the exhaust control valve based on at least one of a throttle opening and engine revolutions, and of a gear position of a transmission.

14. The exhaust control device for an engine of a vehicle according to claim 13, wherein the control unit is adapted to make a determination as to whether or not the vehicle is being decelerated, and if deceleration is determined, the control unit operates the actuator to close the exhaust control valve for applying engine brake.

15. The exhaust control device for an engine of a vehicle according to claim 13, wherein the control unit is adapted to make a determination as to whether or not the vehicle is being suddenly-accelerated, and if sudden acceleration is determined, the control unit operates the actuator to temporarily close the exhaust control valve for temporarily suppressing engine power.

16. The exhaust control device for an engine of a vehicle according to claim 11, wherein the exhaust control valve has a turning axis (CR) vertically oriented generally parallel to an axis (CB) of a cylinder bore, and is disposed at a position offset toward a bent-internal side from a center (CL) of the bent portion.

17. The exhaust control device for an engine of a vehicle according to claim 11, wherein the bent portion is integrally joined to the cylinder head so as to be formed to bend leftward posteriorly to a down frame of the vehicle while avoiding the down frame which is disposed forward of the cylinder head.

18. The exhaust control device for an engine of a vehicle according to claim 11, wherein the exhaust control valve disposed in the exhaust port so as to have a turning axis (CR) horizontally oriented in a left and right direction of the vehicle at a position offset from a center (CL) of the bent portion.

19. The exhaust control device for an engine of a vehicle according to claim 18, wherein the exhaust port is provided integrally with the cylinder head in such a manner as to bend downwardly between a pair of left and right lower frames constituting part of a body frame of the vehicle.

* * * * *